United States Patent
Woo et al.

(10) Patent No.: US 12,394,069 B2
(45) Date of Patent: Aug. 19, 2025

(54) ELECTRONIC DEVICE, METHOD, AND STORAGE MEDIUM FOR OBTAINING IMAGE FOR TRACKING

(71) Applicant: SAMSUNG ELECTRONICS CO., LTD., Suwon-si (KR)

(72) Inventors: Hyuntaek Woo, Suwon-si (KR); Dasom Lee, Suwon-si (KR); Sungoh Kim, Suwon-si (KR); Donghyun Yeom, Suwon-si (KR); Sanghun Lee, Suwon-si (KR); Jungjik Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/751,831

(22) Filed: Jun. 24, 2024

(65) Prior Publication Data

US 2025/0069239 A1  Feb. 27, 2025

Related U.S. Application Data

(63) Continuation of application No. PCT/KR2024/007242, filed on May 28, 2024.

(30) Foreign Application Priority Data

Aug. 25, 2023 (KR) .................. 10-2023-0112327
Nov. 15, 2023 (KR) .................. 10-2023-0158658

(51) Int. Cl.
*G06F 3/01* (2006.01)
*G06F 3/0338* (2013.01)
*G06T 7/246* (2017.01)

(52) U.S. Cl.
CPC .............. *G06T 7/248* (2017.01); *G06F 3/011* (2013.01); *G06F 3/0338* (2013.01); *G06T 2207/30168* (2013.01); *G06T 2207/30196* (2013.01)

(58) Field of Classification Search
CPC .......... G06T 7/248; G06T 2207/30168; G06T 2207/30196; G06F 3/011; G06F 3/0338
See application file for complete search history.

(56) References Cited

U.S. PATENT DOCUMENTS 9,189,068 B2 * 11/2015 Im .................... G06F 3/0304
10,894,208 B2 * 1/2021 Bristol .................. A63F 13/30
(Continued)

FOREIGN PATENT DOCUMENTS

| CN | 107153369 A | 9/2017 |
| KR | 20230047218 A | 4/2023 |
| KR | 20230054725 A | 4/2023 |

OTHER PUBLICATIONS

International Search Report and Written Opinion for International Application No. PCT/KR2024/007242; International Filing Date May 28, 2024; International Search Report Mail Date Sep. 13, 2024; 09 Pages.

*Primary Examiner* — Jonathan A Boyd
(74) *Attorney, Agent, or Firm* — CANTOR COLBURN LLP

(57) ABSTRACT

A wearable device includes memory storing instructions, a camera, and at least one processor. The instructions, when executed by the at least one processor individually or collectively, causes the wearable device to obtain at least one first image having a first attribute for tracking of body portion of a user and at least one second image having a second attribute different from the first attribute for tracking of an external electronic device, to obtain first feature values for tracking of the body portion from the at least one first (Continued)

image and second feature values for tracking of the external electronic device from the at least one second image, to change a mode of the wearable device from the first mode to a second mode based on the first feature values and the second feature values, and to obtain, in the second mode, another images.

20 Claims, 14 Drawing Sheets

(56) References Cited

U.S. PATENT DOCUMENTS

| | | | |
|---|---|---|---|
| 10,902,627 | B2 | 1/2021 | Guignard |
| 10,908,694 | B2 | 2/2021 | Potts et al. |
| 11,620,966 | B2 * | 4/2023 | Tseng ................ G02B 27/0093 345/589 |
| 11,625,841 | B2 | 4/2023 | Wu |
| 2016/0259408 | A1 | 9/2016 | Messingher et al. |
| 2016/0364910 | A1 * | 12/2016 | Higgins ................ A63F 13/213 |
| 2017/0080343 | A1 | 3/2017 | Yamakawa et al. |
| 2019/0384407 | A1 | 12/2019 | Smith et al. |
| 2023/0164433 | A1 | 5/2023 | Nikhara et al. |
| 2023/0186810 | A1 * | 6/2023 | Yu ......................... H04N 23/71 345/690 |

* cited by examiner

ELECTRONIC DEVICE, METHOD, AND STORAGE MEDIUM FOR OBTAINING IMAGE FOR TRACKING

CROSS-REFERENCE TO RELATED APPLICATIONS

This application is a continuation application, claiming priority under § 365(c), of an International application No. PCT/KR2024/007242, filed on May 28, 2024, which is based on and claims the benefit of a Korean patent application number 10-2023-0158658, filed on Nov. 15, 2023, in the Korean Intellectual Property Office, and of a Korean patent application number 10-2023-0112327, filed on Aug. 25, 2023, in the Korean Intellectual Property Office, the disclosure of each of which is incorporated by reference herein in its entirety.

TECHNICAL FIELD

The following descriptions relate to an electronic device, a method, and a storage medium for obtaining image for tracking.

BACKGROUND ART

In order to provide an enhanced user experience, an electronic device providing an extended reality service that displays information generated by a computer in connection with an external object in the real world or a virtual object in the virtual world is being developed. The electronic device may include a wearable device that may be worn by a user. For example, the electronic device may include user equipment, augmented reality (AR) glasses, virtual reality (VR) glasses, and/or a head-mounted device (HMD) (e.g., a video see through (VST) HMD, and an optical see through (OST) HMD).

The above-described information may be provided as a related art for the purpose of helping to understand the present disclosure. No claim or determination is raised as to whether any of the above-described information may be applied as a prior art related to the present disclosure.

DISCLOSURE

Technical Solution

A wearable device may include memory storing instructions, a camera, and at least one processor. The instructions, when executed by the at least one processor, may cause the wearable device to obtain, through the camera in a first mode, images including at least one first image having a first attribute for tracking of body portion of a user and at least one second image having a second attribute different from the first attribute for tracking of an external electronic device. The number of the at least one first image may correspond to the number of the at least one second image. The instructions, when executed by the at least one processor, may cause the wearable device to obtain first feature values for tracking of the body portion from the at least one first image and second feature values for tracking of the external electronic device from the at least one second image. The instructions, when executed by the at least one processor, may cause the wearable device to change a mode of the wearable device from the first mode to a second mode based on the first feature values and the second feature values. The instructions, when executed by the at least one processor, may cause the wearable device to obtain, through the camera in the second mode, another images. The number of an image having the first attribute of the another images may differ from the number of an image having the second attribute of the another images.

A method performed by the wearable device may include obtaining, in the first mode, the images including at least one first image having the first attribute for tracking of the body portion of the user and at least one second image having the second attribute different from the first attribute for tracking of the external electronic device. The number of the at least one first image may correspond to the number of the at least one second image. The method may include obtaining the first feature values for tracking of the body portion from the at least one first image and the second feature values for tracking of the external electronic device from the at least one second image. The method may include changing the mode of the wearable device from the first mode to the second mode based on the first feature values and the second feature values. The method may include obtaining, in the second mode, another images through the camera. The number of the image having the first attribute of the another images may differ from the number of the image having the second attribute of the another images.

A non-transitory computer-readable storage medium may store one or more programs including instructions that, when executed by at least one processor of the wearable device comprising a camera, cause through the camera in the first mode to obtain the images including at least one first image having the first attribute for tracking of the body portion of the user and at least one second image having the second attribute different from the first attribute for tracking of an external electronic device. The number of the at least one first image may correspond to the number of the at least one second image. The non-transitory computer-readable storage medium may store one or more programs including instructions that, when executed by the at least one processor, cause the wearable device to obtain the first feature values for tracking of the body portion from the at least one first image and the second feature values for tracking of the external electronic device from the at least one second image. The non-transitory computer-readable storage medium may store one or more programs including instructions that, when executed by the at least one processor, cause the wearable device to change the mode of the wearable device from the first mode to the second mode based on the first feature values and the second feature values. The non-transitory computer-readable storage medium may store one or more programs including instructions that, when executed by the at least one processor, cause the camera in the second mode to obtain another images. The number of the image having the first attribute of the another images may differ from the number of the image having the second attribute of the another images.

DETAILED DESCRIPTION

The terms used in the present disclosure are used only to describe a specific embodiment and may not be intended to limit the scope of other embodiments. Singular expressions may include plural expressions unless the context clearly represents otherwise. The terms used herein, including technical or scientific terms, may have the same meaning as those generally understood by a person skilled in the technical field described in the present disclosure. Among the terms used in the present disclosure, terms defined in general dictionary may be interpreted in the same or similar meaning as they have in the context of related technology and are not interpreted in an ideal or excessively formal sense unless explicitly defined in the present disclosure. In some cases, even the term defined in the present disclosure may not be interpreted to exclude embodiments of the present disclosure.

In various embodiments of the present disclosure described below, a hardware approach will be described as an example. However, since various embodiments of the present disclosure include technology that uses both hardware and software, various embodiments of the present disclosure do not exclude software-based approach.

In addition, in the present disclosure, the term 'greater than' or 'less than' may be used to determine whether a particular condition is satisfied or fulfilled, but this is only a description to express an example and does not exclude description of 'more or equal to' or 'less or equal to'. Conditions described as 'greater than or equal to' may be replaced with 'greater than', conditions described as 'less than or equal to' may be replaced with 'less than', and conditions described as 'greater than or equal to and less than' can be replaced with 'greater than and less than or equal to'. In addition, hereinafter, 'A' to 'B' means at least one of the elements from A (including A) to B (including B).

Figure 1:
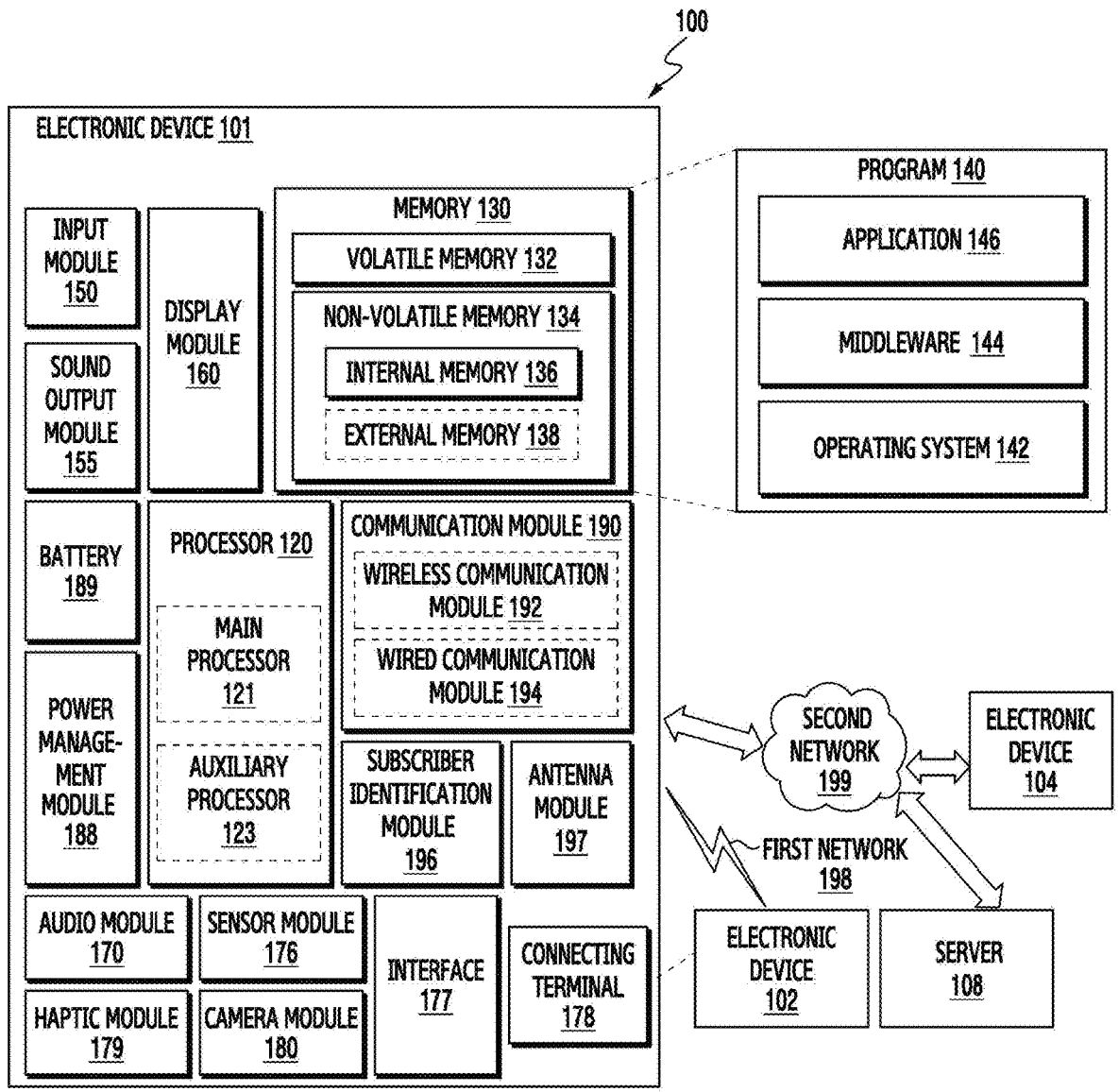
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
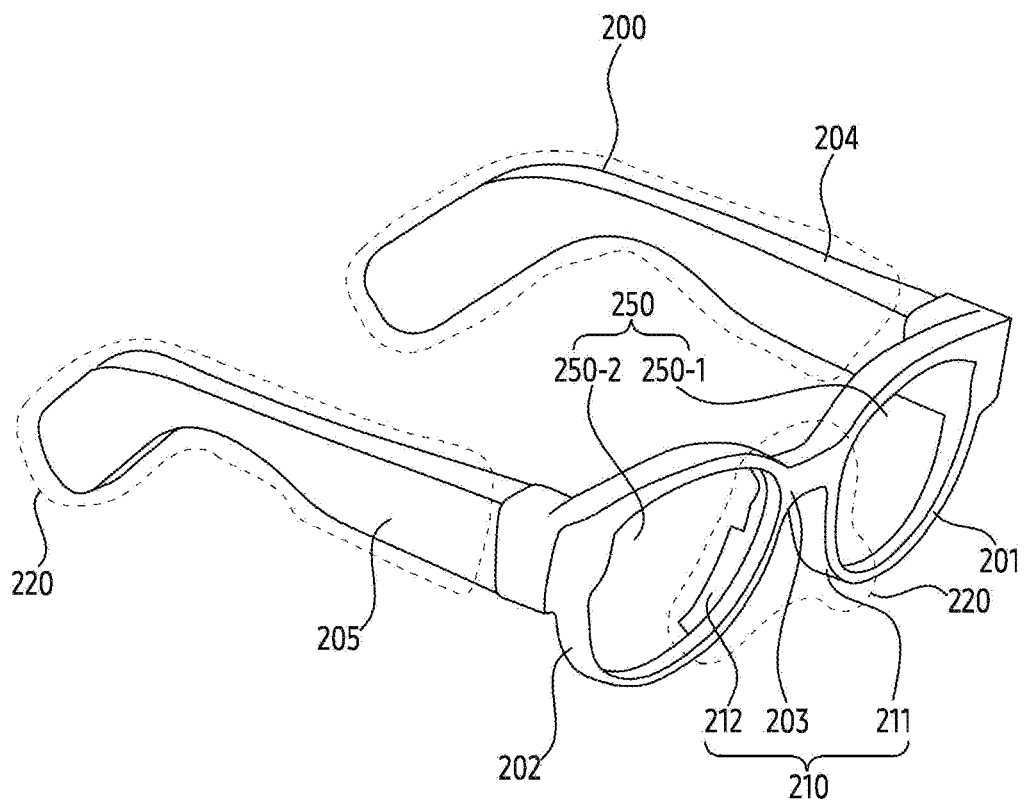
FIG. 2A illustrates an example of a perspective view of a wearable device according to various embodiments.
Figure 2B:
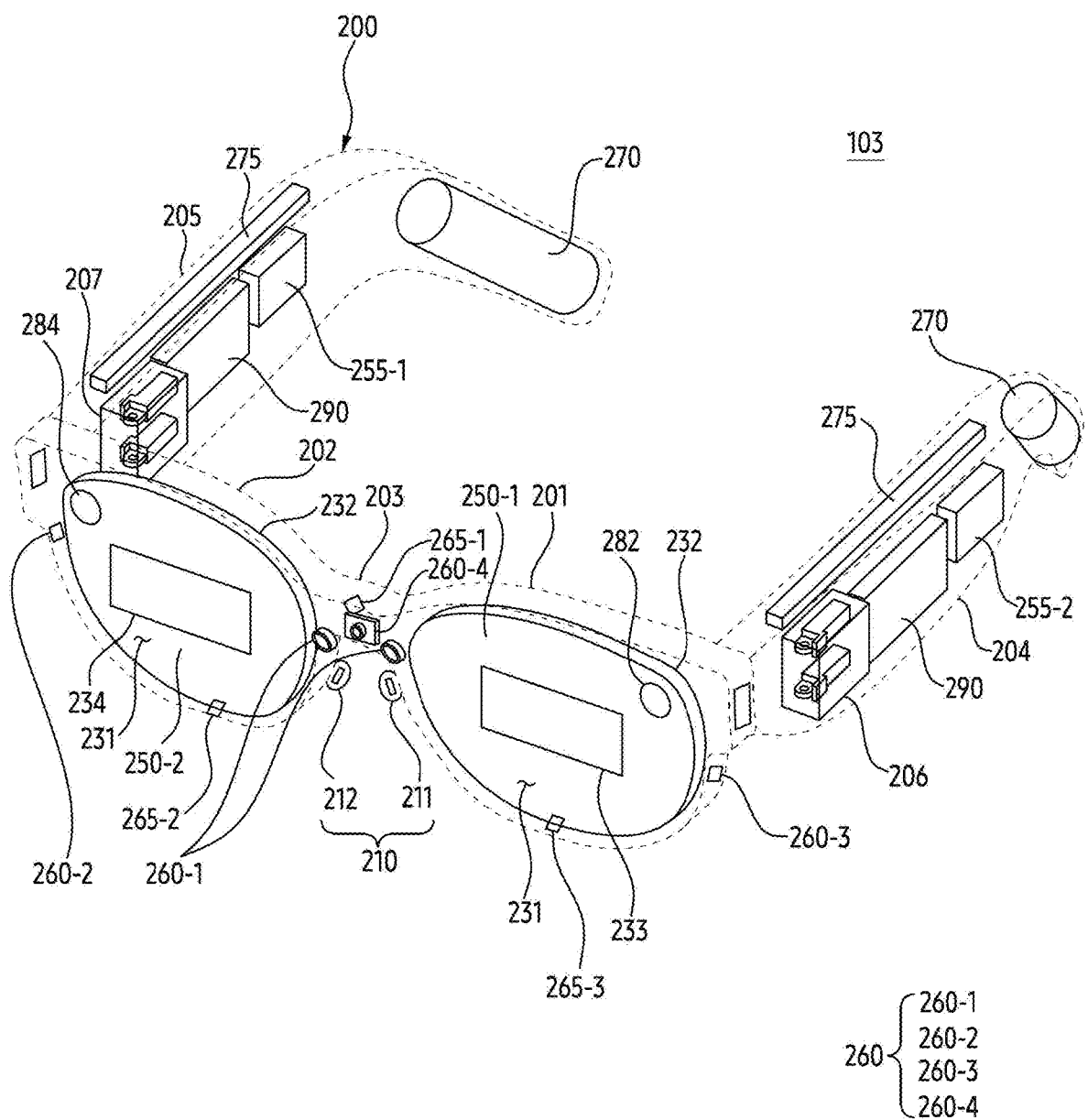
FIG. 2B illustrates an example of one or more hardware disposed in a wearable device according to various embodiments.

FIG. 2A illustrates an example of a perspective view of a wearable device according to various embodiments. FIG. 2B illustrates an example of one or more hardware disposed in a wearable device according to various embodiments.

According to an embodiment, the wearable device 103 may have a shape of glasses wearable on body portion of a user (e.g., a head). The wearable device 103 of FIGS. 2A and 2B may be an example of the electronic device 101 of FIG. 1. The wearable device 103 may include a head-mounted display (HMD). For example, a housing of the wearable device 103 may include a flexible material such as rubber and/or silicon having a shape in close contact with the portion (e.g., the portion of the face covering both eyes) of the user's head. For example, the housing of the wearable device 103 may include one or more straps able to be twined (e.g., wrapped, curved, or fitted) around the user's head and/or one or more temples attached to an ear of the head.

Referring to FIG. 2A, according to an embodiment, the wearable device 103 may include at least one display 250 and a frame 200 supporting the at least one display 250.

According to an embodiment, the wearable device 103 may be worn on the body portion of the user. The wearable device 103 may provide an extended reality (XR) to the user wearing the wearable device 103. For example, the extended reality may provide augmented reality (AR), virtual reality (VR), or mixed reality (MR) that combines augmented reality and virtual reality. For example, the wearable device 103 may display the virtual reality image provided by at least one optical device 282 and 284 of FIG. 2B on at least one display 250 in response to a designated gesture of the user obtained through a gesture recognition camera 260-2 and 263 of FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may provide visual information transmitted from external light to a user and other visual information distinguished from the above visual information, through a lens included in at least one display 250. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of at least one display 250. When the user wears the wearable device 103, ambient light may be transmitted to the user by being incident on the first surface 231 and being penetrated through the second surface 232. For another example, the at least one display 250 may display an augmented reality image in which a virtual reality image provided by the at least one optical device 282 and 284 is combined with a reality screen transmitted through external light, on a display area formed on the second surface 232.

According to an embodiment, the at least one display 250 may include at least one waveguide 233 and 234 that transmits light transmitted from the at least one optical device 282 and 284 by diffracting to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal or curved shape. Light incident to an end of the at least one waveguide 233 and 234 may be propagated to another end of the at least one waveguide 233 and 234 by the nano pattern. The at least one waveguide 233 and 234 may include at least one of at least one diffraction element (e.g., a diffractive optical element (DOE), a holographic optical element (HOE)), and a reflection element (e.g., a reflection mirror). For example, the at least one waveguide 233 and 234 may be disposed in the wearable device 103 to guide a screen displayed by the at least one display 250 to the user's eyes. For example, the screen may be transmitted to the user's eyes through total internal reflection (TIR) generated in the at least one waveguide 233 and 234.

The wearable device 103 may analyze an object included in a real image collected through a photographing camera 260-4, combine with a virtual object corresponding to an object that become a subject of augmented reality provision among the analyzed object, and display on the at least one display 250. The virtual object may include at least one of text and images for various information associated with the object included in the real image. The wearable device 103 may analyze the object based on a multi-camera such as a stereo camera. For the object analysis, the wearable device 103 may execute space recognition (e.g., simultaneous localization and mapping (SLAM) using the multi-camera and/or time-of-flight (ToF). The user wearing the wearable device 103 may watch an image displayed on the at least one display 250.

According to an embodiment, a frame 200 may be configured with a physical structure in which the wearable device 103 may be worn on the user's body. According to an embodiment, the frame 200 may be configured so that when the user wears the wearable device 103, the first display 250-1 and the second display 250-2 may be positioned corresponding to the user's left and right eyes. The frame 200 may support the at least one display 250. For example, the frame 200 may support the first display 250-1 and the second display 250-2 to be positioned at positions corresponding to the user's left and right eyes.

Referring to FIG. 2A, according to an embodiment, the frame 200 may include an area 220 at least partially in contact with the portion of the user's body in the case when the user wears the wearable device 103. For example, the area 220 of the frame 200 in contact with the portion of the user's body may include an area in contact with a portion of the user's nose, a portion of the user's ear, and a portion of the side of the user's face that the wearable device 103 contacts. According to an embodiment, the frame 200 may include a nose pad 210 that contacts the portion of the user's body. When the wearable device 103 is worn by the user, the nose pad 210 may contact the portion of the user's nose. The frame 200 may include a first temple 204 and a second temple 205 that contact another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 103 may identify an external object (e.g., a user's fingertip) touching the frame 200 and/or a gesture performed by the external object by using a touch sensor, a grip sensor, and/or a proximity sensor formed on at least a portion of the surface of the frame 200.

According to an embodiment, the wearable device 103 may include hardware (e.g., hardware to be described later based on a block diagram of FIG. 5) that performs various functions. For example, the hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., printed circuit board). Various hardware may be disposed in the frame 200.

According to an embodiment, the microphone (e.g., the microphones 265-1, 265-2, and 265-3) of the wearable device 103 may obtain a sound signal, by being disposed on at least a portion of the frame 200. The first microphone 265-1 disposed on the bridge 203, the second microphone 265-2 disposed on the second rim 202, and the third microphone 265-3 disposed on the first rim 201 are illustrated in FIG. 2B, but the number and disposition of the microphone 265 are not limited to an embodiment of FIG. 2B. In the case when the number of the microphones 265 included in the wearable device 103 is two or more, the wearable device 103 may identify the direction of the sound signal by using a plurality of microphones disposed on different portions of the frame 200.

According to an embodiment, the at least one optical device 282 and 284 may project a virtual object on the at least one display 250 in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. According to an embodiment, the wearable device 103 may include a first optical device 282 corresponding to the first display 250-1, and a second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first waveguide 233 disposed on the first display 250-1, and the second optical device 284 may transmit light to the second waveguide 234 disposed on the second display 250-2.

In an embodiment, a camera 260 may include the photographing camera 260-4, an eye tracking camera (ET CAM) 260-1, and/or the motion recognition camera 260-2 and camera 260-3. The photographing camera 260-4, the eye tracking camera 260-1, and the motion recognition camera 260-2 and camera 260-2 may be disposed at different positions on the frame 200 and may perform different functions. The eye tracking camera 260-1 may output data indicating a position of the eye or the gaze of the user wearing the wearable device 103. For example, the wearable device 103 may detect the gaze from an image including the user's pupil obtained through the eye tracking camera 260-1. The wearable device 103 may perform a gaze interaction with at least one object by using a user's gaze obtained through the eye tracking camera 260-1. The wearable device 103 may represent a portion corresponding to an eye of an avatar indicating the user in the virtual space, by using the user's gaze obtained through the eye tracking camera 260-1. The wearable device 103 may render an image (or a screen) displayed on the at least one display 250, based on the position of the user's eye. For example, visual quality (e.g., resolution, brightness, saturation, grayscale, and PPI) of a first area related to the gaze within the image and a second area distinguished from the first area may be different. For example, when the wearable device 103 supports an iris recognition function, user authentication may be performed based on iris information obtained using the eye tracking camera 260-1. An example in which the eye tracking camera 260-1 is disposed toward the user's right eye is illustrated in FIG. 2B, but the embodiment is not limited thereto, and the eye tracking camera 260-1 may be disposed alone toward the user's left eye or may be disposed toward two eyes.

In an embodiment, the photographing camera 260-4 may photograph a real image or background to be matched with a virtual image in order to implement the augmented reality or mixed reality content. The photographing camera 260-4 may photograph an image of a specific object existing at a position viewed by the user and may provide the image to the at least one display 250. The at least one display 250 may display one image in which a virtual image provided through the at least one optical device 282 and 284 is overlapped with information on the real image or background including an image of the specific object obtained by using the photographing camera. The wearable device 103 may compensate for depth information (e.g., a distance between the wearable device 103 and an external object obtained through a depth sensor), by using an image obtained through the photographing camera 260-4. The wearable device 103 may perform object recognition through an image obtained using the photographing camera 260-4. While displaying a screen representing a virtual space on the at least one display 250, the wearable device 103 may perform a pass through function for displaying an image obtained through the photographing camera 260-4 overlapping at least a portion of the screen. In an embodiment, the photographing camera may be disposed on the bridge 203 disposed between the first rim 201 and the second rim 202.

The eye tracking camera 260-1 may implement a more realistic augmented reality by matching the user's gaze with the visual information provided on the at least one display 250, by tracking the gaze of the user wearing the wearable device 103. For example, when the user looks at the front, the wearable device 103 may naturally display environment information associated with the user's front on the at least one display 250 at a position where the user is positioned. The eye tracking camera 260-1 may be configured to capture an image of the user's pupil in order to determine the user's gaze. For example, the eye tracking camera 260-1 may receive gaze detection light reflected from the user's pupil and may track the user's gaze based on the position and movement of the received gaze detection light. In an embodiment, the eye tracking camera 260-1 may be disposed at a position corresponding to the user's left and right eyes. For example, the eye tracking camera 260-1 may be disposed in the first rim 201 and/or the second rim 202 to face the direction in which the user wearing the wearable device 103 is positioned.

The motion recognition camera 260-2 and camera 260-3 may provide a specific event to the screen provided on the at least one display 250 by recognizing the movement of the whole or portion of the user's body, such as the user's torso, hand, or face. The motion recognition camera 260-2 and camera 260-3 may obtain a signal corresponding to motion by recognizing the user's motion (e.g., gesture recognition), and may provide a display corresponding to the signal to the at least one display 250. The wearable device 103 may identify a signal corresponding to the operation and may perform a preset function based on the identification. The motion recognition camera 260-2 and 260-3 may be used to perform simultaneous localization and mapping (SLAM) for 6 degrees of freedom pose (6 dof pose) and/or a space recognition function using a depth map. The wearable device 103 may perform a gesture recognition function and/or an object tracking function, by using the motion recognition cameras 260-2 and 260-3. In an embodiment, the motion recognition camera 260-2 and camera 260-3 may be disposed on the first rim 201 and/or the second rim 202.

The camera 260 included in the wearable device 103 is not limited to the above-described eye tracking camera 260-1 and the motion recognition camera 260-2 and 260-3. For example, the wearable device 103 may identify an external object included in the FoV by using a camera disposed toward the user's field of view (FoV). The wearable device 103 may identify the external object based on a sensor for identifying a distance between the wearable device 103 and the external object, such as a depth sensor and/or a time of flight (ToF) sensor. The camera 260 disposed toward the FoV may support an autofocus function and/or an optical image stabilization (OIS) function. For example, in order to obtain an image including a face of the user wearing the wearable device 103, the wearable device 103 may include the camera 260 (e.g., a face tracking (FT) camera) disposed toward the face.

Although not illustrated, the wearable device 103 according to an embodiment may further include a light source (e.g., LED) that emits light toward a subject (e.g., user's eyes, face, and/or an external object in the FoV) photographed by using the camera 260. The light source may include an LED having an infrared wavelength. The light source may be disposed on at least one of the frame 200, and the hinge units 206 and 207.

According to an embodiment, the battery module 270 may supply power to electronic components of the wearable device 103. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may transmit the signal or power to the outside of the wearable device 103 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

A speaker 255 may output a sound signal to the outside of the wearable device 103. A sound output module may be referred to as a speaker. In an embodiment, the speaker 255 may be disposed in the first temple 204 and/or the second temple 205 in order to be disposed adjacent to the car of the user wearing the wearable device 103. For example, the speaker 255 may include a second speaker 255-2 disposed adjacent to the user's left ear by being disposed in the first temple 204, and a first speaker 255-1 disposed adjacent to the user's right car by being disposed in the second temple 205.

The light emitting module (not illustrated) may include at least one light emitting element. The light emitting module may emit light of a color corresponding to a specific state or may emit light through an operation corresponding to the specific state in order to visually provide information on a specific state of the wearable device 103 to the user. For example, when the wearable device 103 requires charging, it may emit red light at a constant cycle. In an embodiment, the light emitting module may be disposed on the first rim 201 and/or the second rim 202.

Referring to FIG. 2B, according to an embodiment, the wearable device 103 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by blocks described with reference to FIG. 5) included in the wearable device 103 may be disposed. The wearable device 103 may include a flexible PCB (FPCB) for interconnecting the hardware.

According to an embodiment, the wearable device 103 may include at least one of a gyro sensor, a gravity sensor, and/or an acceleration sensor for detecting the posture of the wearable device 103 and/or the posture of a body part (e.g., a head) of the user wearing the wearable device 103. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 103 may identify the user's motion and/or gesture performed to execute or stop a specific function of the wearable device 103 based on the IMU.

Figure 3A:
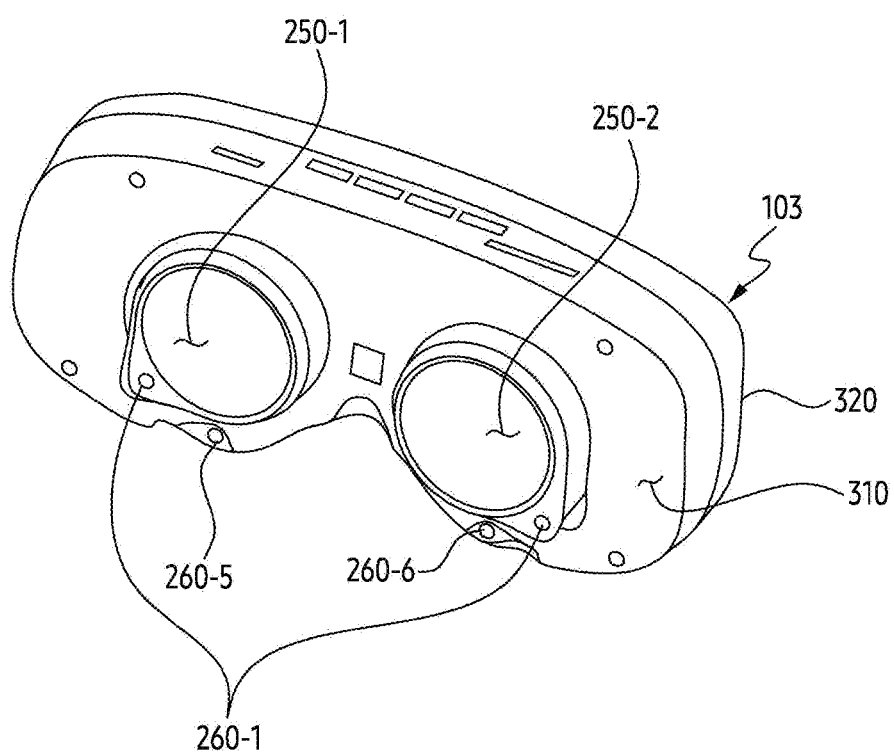
FIGS. 3A and 3B illustrate an example of the exterior of a wearable device according to various embodiments.
Figure 3B:
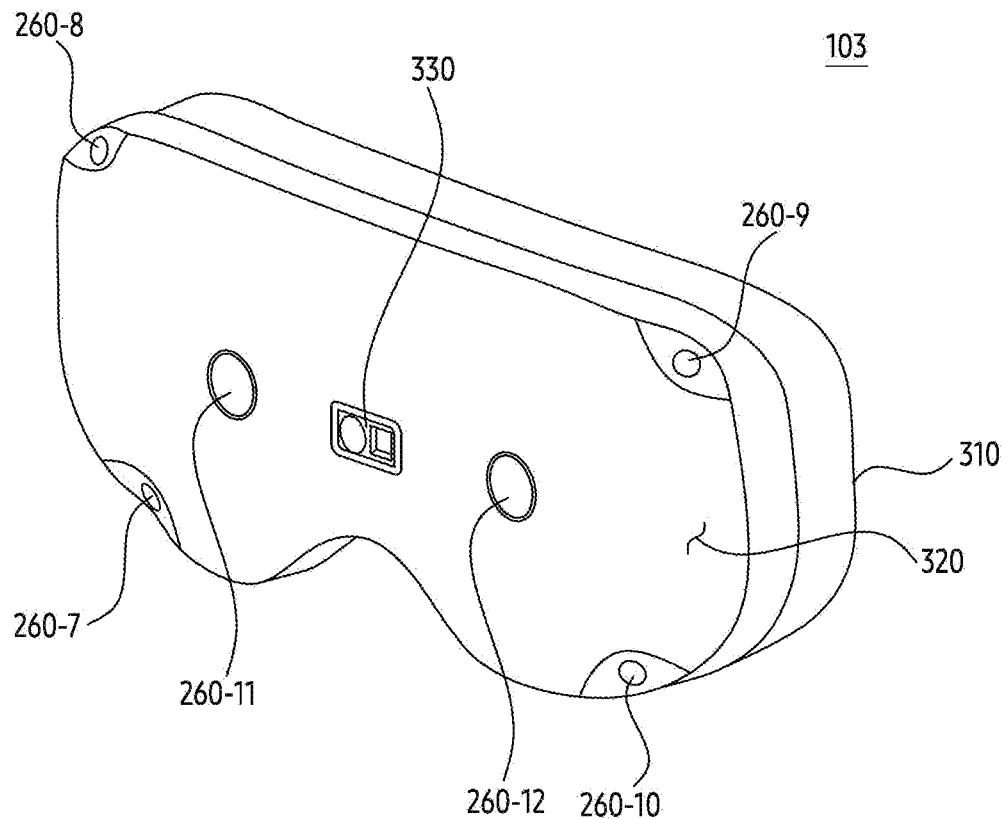

FIGS. 3A and 3B illustrate an example of the exterior of a wearable device according to various embodiments.

The wearable device 103 of FIGS. 3A and 3B may be an example of the electronic device 101 of FIG. 1. According to an embodiment, an example of an appearance of a first surface 310 of the housing of the wearable device 103 is illustrated in FIG. 3A, and an example of an appearance of a second surface 320 opposite to the first surface 310 is illustrated in FIG. 3B.

Referring to FIG. 3A, according to an embodiment, the first surface 310 of the wearable device 103 may have an attachable shape on or conform to the user's body part (e.g., the user's face). Although not illustrated, the wearable device 103 may further include a strap for being fixed on the user's body part, and/or one or more temples (e.g., the first temple 204 and/or the second temple 205 of FIGS. 2A to 2B). A first display 250-1 for outputting an image to the left eye among the user's two eyes and a second display 250-2 for outputting an image to the right eye among the user's two eyes may be disposed on the first surface 310. The wearable device 103 may further include rubber or silicon packing, which are formed on the first surface 310, for preventing interference by light (e.g., ambient light) different from the light emitted from the first display 250-1 and the second display 250-2.

According to an embodiment, the wearable device 103 may include cameras 260-1 for photographing and/or tracking two eyes of the user adjacent to each of the first display 250-1 and the second display 250-2. The cameras 260-1 may be referred to as the gaze tracking camera 260-1 of FIG. 2B. According to an embodiment, the wearable device 103 may include cameras 260-5 and 260-6 for photographing and/or recognizing the user's face. The cameras 260-5 and 260-6 may be referred to as a FT camera. The wearable device 103 may control an avatar representing a user in a virtual space, based on a motion of the user's face identified using the cameras 260-5 and 260-6.

Referring to FIG. 3B, a camera (e.g., cameras 260-7, 260-8, 260-9, 260-10, 260-11, and 260-12), and/or a sensor (e.g., the depth sensor 330) for obtaining information associated with the external environment of the wearable device 103 may be disposed on the second surface 320 opposite to the first surface 310 of FIG. 3A. For example, the cameras 260-7, 260-8, 260-9, and 260-10 may be disposed on the second surface 320 in order to recognize an external object. The cameras 260-7, 260-8, 260-9, and 260-10 may be referred to the motion recognition cameras 260-2 and 260-3 of FIG. 2B.

For example, by using cameras 260-11 and 260-12, the wearable device 103 may obtain an image and/or video to be transmitted to each of the user's two eyes. The camera 260-11 may be disposed on the second surface 320 of the wearable device 103 to obtain an image to be displayed through the second display 250-2 corresponding to the right eye among the two eyes. The camera 260-12 may be disposed on the second surface 320 of the wearable device 103 to obtain an image to be displayed through the first display 250-1 corresponding to the left eye among the two eyes. The cameras 260-11 and 260-12 may be referred to the photographing camera 260-4 of FIG. 2B.

According to an embodiment, the wearable device 103 may include the depth sensor 330 disposed on the second surface 320 in order to identify a distance between the wearable device 103 and the external object. By using the depth sensor 330, the wearable device 103 may obtain spatial information (e.g., a depth map) about at least a portion of the FoV of the user wearing the wearable device 103. Although not illustrated, a microphone for obtaining sound outputted from the external object may be disposed on the second surface 320 of the wearable device 103. The number of microphones may be one or more according to embodiments.

Figure 4:
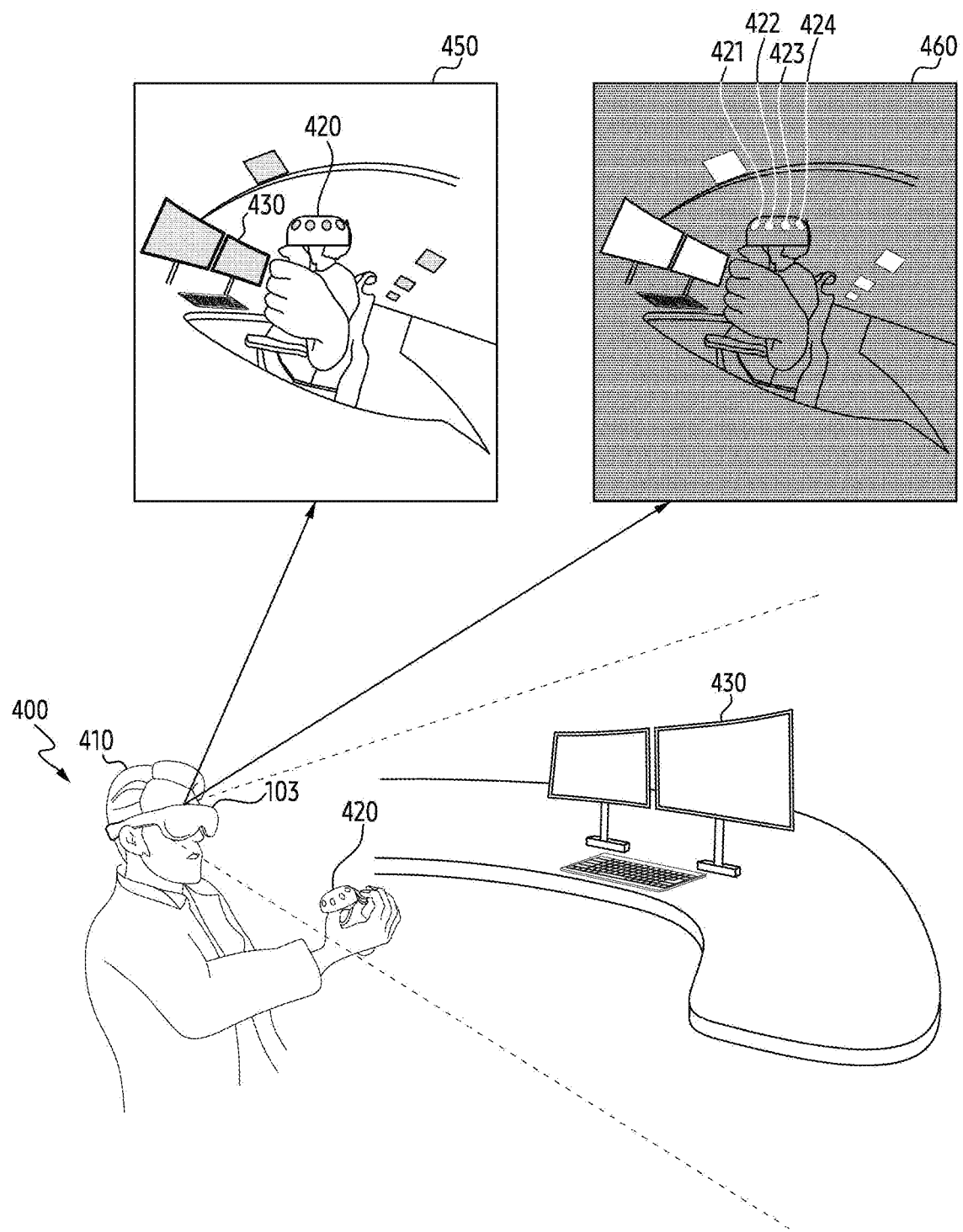
FIG. 4 illustrates an example of a method of obtaining an image for tracking of body portion and an image for tracking of an external electronic device.

FIG. 4 illustrates an example of a method of obtaining an image for tracking of a body portion and an image for tracking of an external electronic device.

A wearable device 103 of FIG. 4 may represent an example of an electronic device 101 of FIG. 1 and the wearable device 103 of FIGS. 2A to 3B. In the example 400 of FIG. 4, a case in which the wearable device 103 provides an augmented reality (AR) environment is illustrated, but an embodiment of the present disclosure is not limited thereto. For example, the wearable device 103 may provide an extended reality (XR) environment including a virtual reality (VR) environment.

FIG. 4 illustrates the example 400 of the method in which a user 410 wearing the wearable device 103 obtains images for tracking of the external electronic device 420 and tracking of the body portion.

For example, tracking of the body portion may be used to obtain information on position or movement of the user 410 for the body portion. For example, the tracking of the body portion may be referred to as a first tracking. For example, the body portion may include at least one of a head of the user or a hand of the user. For example, the tracking for the hand may be referred to as hand tracking. Similarly, for example, the tracking for the head may be referred to as head tracking.

For example, the tracking of the external electronic device 420 may be used to obtain information on position, movement, and/or an input of the external electronic device 420. For example, the tracking of the external electronic device 420 may be referred to as a second tracking. For example, the external electronic device 420 may be connected to the wearable device 103. For example, the wearable device 103 may establish a connection with the external electronic device 420 using a communication technique. For example, the communication technique may include a wired communication technique or a wireless communication technique. For example, the wearable device 103 may obtain the information from the external electronic device 420 based on the established connection. For example, the external electronic device 420 may be connected to the wearable device 103 and used to obtain the input of the user 410. For example, the external electronic device 420 may be referred to as a controller, a control device, or an input device of the wearable device 103.

According to an embodiment, the wearable device 103 may perform the second tracking through an image of a hand (e.g., a right hand) gripping the external electronic device 420, and may perform the first tracking through an image of a hand (e.g., a left hand) not gripping the external electronic device 420.

Referring to an example 400, the wearable device 103 may be worn by the user 410. For example, the user 410 may wear the wearable device 103 on the head. Also, referring to example 400, the external electronic device 420 may be gripped by the user 410. For example, the user 410 may grip the external electronic device 420 through the right hand of the user 410. The example 400 of FIG. 4 is only for convenience of description, and an embodiment of the present disclosure is not limited thereto.

Referring to the example 400, the wearable device 103 may obtain a first image 450 to perform the tracking on the body portion (e.g., the head) of the user 410. For example, the wearable device 103 may obtain the first image 450 through a field of view (FoV) of a camera (e.g., a camera module 180 of FIG. 1) of the wearable device 103. For example, the first image 450 for tracking for the body portion may include an external object 430 and the external electronic device 420. The wearable device 103 may perform the tracking on the body portion based on a variation of the boundary of the external object 430 and the external electronic device 420 of the first image 450. For example, the wearable device 103 may perform the tracking on the body portion based on the position of the boundary of the external object 430 and the external electronic device 420 in the first image 450 of a first timing and the position of the boundary of the external object 430 and the external electronic device 420 in the first image 450 of a second timing different from the first timing. The boundary can include the location, outline, placement, etc., of the object. In the above example, the boundary constituting the appearance of the external object 430 and/or the external electronic device 420 has been described as an example, but an embodiment of the present disclosure is not limited thereto. For example, the wearable device 103 may perform the tracking on the body portion based on at least one point of the external object 430.

Referring to the example 400, the wearable device 103 may obtain a second image 460 to perform the tracking on the external electronic device 420 of the user 410. For example, the wearable device 103 may obtain the second image 450 through the field of view (FoV) of the camera (e.g., a camera module 180 of FIG. 1) of the wearable device 103. For example, the second image 460 for tracking for the external electronic device 420 may include light sources 421, 422, 423, and 424 of the external electronic device 420. For example, the light sources 421, 422, 423, and 424 may include light emitting devices of the external electronic device 420. The wearable device 103 may perform the tracking on the external electronic device 420 based on a variation of the boundary of the light sources 421, 422, 423, and 424 of the second image 460. For example, the wearable device 103 may perform the tracking on the external electronic device 420 based on the position of the boundary of the light sources 421, 422, 423, and 423 in the second image 460 of the first timing and the position of the boundary of the light sources 421, 422, 423, and 423 in the second image 460 of the second timing different from the first timing. In the above example, the boundary of the light sources 421, 422, 423, and 423 is described as an example, but an embodiment of the present disclosure is not limited thereto. For example, the wearable device 103 may perform the tracking on the external electronic device 420 based on at least one point of the light sources 421, 422, 423, and 423.

For example, the first image 450 and the second image 460 may have a different attribute. For example, the first image 450 may have a first attribute, and the second image 460 may have a second attribute different from the first attribute. For example, the attribute may include brightness, color, and saturation of an image. For example, the first image 450 may have first brightness, which is the first attribute. In contrast, the second image 460 may have second brightness, which is the second attribute. The second brightness may be darker than the first brightness. For example, the attribute may be referred to as brightness, characteristic, parameter, or characteristic parameter.

Referring to the example 400, the wearable device 103 may use the first image 450 having the first brightness to perform the tracking of the body portion. The first image 450 may have the first brightness so that an appearance of the external object 430 and the external electronic device 420 are clearly visible. At this time, in the first image 450 having the first brightness, the boundary (or point) of the external electronic device 420 and the external object 430 may be clearly visible. In contrast, the wearable device 103 may use the second image 460 having the second brightness to perform the tracking of the external electronic device 420. The second image 460 may have the second brightness so that the shape of the external object 430 is not visible or blurred. At this time, in the second image 460 having the second brightness, the light sources 421, 422, 423, and 424 of the external electronic device 420 may be clearly visible. The light sources 421, 422, 423, and 424 may be displayed more clearly in the second image 460 of the second brightness than the first image 450 of the first brightness.

In the example 400, an example of the wearable device 103 obtaining one first image 450 and one second image 460 is illustrated, but an embodiment of the present disclosure is not limited thereto. For example, the wearable device 103 may obtain a plurality of the first images 450 and a plurality of the second images 460. At this time, the plurality of the first images 450 and the plurality of the second images 460 may be obtained based on frame per second (FPS) for the camera of the wearable device 103 to obtain the image (or video). For example, when the FPS set in the camera is 60 FPS, the wearable device 103 may obtain 60 frames in one second. The frame may be referred to as an image or a frame image. Each of the frames may include at least one of the first image 450 and the second image 460. In one example, the wearable device 103 may alternately obtain the first image 450 and the second image 460. Details related to this are described in FIGS. 7A to 7C below.

Embodiments of the present disclosure propose the electronic device and a method for controlling the obtainment of images (or video) used for the first tracking and the second tracking in an XR environment. In the XR environment, the wearable device 103 may identify the position and direction of the user 410 (or the body portion of the user 410) by using information obtained through the camera (e.g., the camera module 180 of FIG. 1) or a sensor (e.g., the sensor module 176 of FIG. 1). The technology for recognizing the position and the direction of the user 410 may be referred to as the first tracking or head tracking. Also, the wearable device 103 may use the external electronic device 420 and the hand of the user 410 to interact with a virtual object. In the case that the external electronic device 420 is used, the wearable device 103 may recognize the position and the direction of the external electronic device 420 and perform interaction with the virtual object. The technology for recognizing the position and the direction of the external electronic device 420 may be referred to as the second tracking or controller tracking.

In the first tracking and the second tracking, images (or video) of the camera may be used. At this time, the images (e.g., the first image 450) used for the first tracking may be different from another images (e.g., the second image 460) used for the second tracking. The images used for the first tracking may be obtained through the camera dedicated to the first tracking, and the another images used for the second tracking may be obtained through another camera dedicated to the second tracking for the external electronic device 420. Also, the images and the another images may be obtained through the same camera. In the case that the images and the another images are obtained through the plurality of cameras including the camera and the another camera, power consumption of the wearable device 103 may increase, and a cost for producing the wearable device 103 may increase. Accordingly, it may be efficient to obtain the images and the another images through one camera.

In the case that the images and the another images are obtained through one camera, the attribute of the images and the attribute of the another images may be different. For example, the brightness of the images may be brighter than that of the another images. In the case of the images, since feature values including the boundary or the point of an object in the images are used, a bright image may be used. In contrast, in the case of the another images, since the feature values including light (e.g., light sources 421, 422, 423, and 424) emitted by the external electronic device 420 in the another images are used, a dark image may be used. The bright image may represent the image having the first attribute, and the dark image may represent the image having the second attribute. The wearable device 103 may obtain the images for the first tracking and the another images for the second tracking through the one camera to provide both the first tracking and the second tracking. Accordingly, the wearable device 103 may alternately use a first filming scheme or a first shooting scheme (hereinafter, a first scheme) for obtaining the bright images for the first tracking and a second filming scheme or a second shooting scheme (hereinafter, a second scheme) for obtaining the another dark images for the second tracking. That is, the wearable device 103 may alternately repeat obtaining the images through the first scheme and obtaining the another images through the second scheme. The first scheme and the second scheme may be used in a shooting mode for obtaining the image.

For example, the first scheme for obtaining the images and the second scheme for obtaining the another images may be identified based on an exposure algorithm for obtaining the image. For example, the scheme may represent a case of using an auto exposure algorithm. In contrast, the second scheme may represent a case of using a fixed exposure algorithm. For example, in the case in which the auto exposure algorithm is used, the exposure time may be longer than a case in which the fixed exposure algorithm is used. At this time, the wearable device 103 may calculate the exposure time used in the auto exposure algorithm. In other words, compared to the case of obtaining the another images through the second scheme, the wearable device 103 may obtain light through the camera for a longer time to obtain the images through the first scheme, and obtain the images based on this first scheme.

Additionally and/or alternatively, for example, the first scheme and the second scheme may be identified based on a gain value for obtaining an image. For example, the first scheme may represent the case of using a relatively high gain value. In contrast, the second scheme may represent the case of using a relatively low gain value. The wearable device 103 may obtain image information on an actual environment through the camera, and perform processing based on the gain value on the image information. Based on the processing, the wearable device 103 may obtain the images or the another images. At this time, the higher the gain value is, the higher the brightness of the obtained image can be. In other words, the wearable device 103 may obtain the images using the high gain value through or by the first scheme. In contrast, the wearable device 103 may obtain the another images using the low gain value through or by the second scheme.

Additionally and/or alternatively, for example, the first scheme and the second scheme may be identified based on the brightness of the light source included in the wearable device 103. For example, the light source included in the wearable device 103 may include an inflated radiation (IR) illuminator. For example, the first scheme may represent the case in which the brightness of the light source is relatively high. In contrast, the second scheme may represent the case in which the brightness of the light source is relatively low. The light source may be used as a light used by the wearable device 103 to obtain the image. In other words, the wearable device 103 may obtain the images using the high brightness of the light source through the first scheme. In contrast, the wearable device 103 may obtain the another images by using the low brightness of the light source through the second scheme.

In general, the wearable device 103 may alternately use the first scheme and the second scheme to obtain the relatively bright images and the another relatively dark images through or using one camera. At this time, it may be difficult for the wearable device 103 to support the case in which the images are required relatively more than the another images (or the another images are required relatively more than the images). Accordingly, an inefficiency in the first tracking and the second tracking of the wearable device 103 may occur. For example, in the case that the external electronic device 420 is positioned outside the FoV of the camera, the second tracking cannot be performed, so that the second scheme and the first scheme are used at the same frequency, which may cause an inefficiency. Also, for example, in the case that it is necessary to support the accuracy and fast response speed of the external electronic device 420, more of the another images to be used for the second tracking may be needed. However, since wearable device 103 obtains the images and the another images alternately through the one camera, relatively more of the another images cannot be obtained, which may result in inefficiency.

Hereinafter, the electronic device and the method according to embodiments of the present disclosure may use a variable sequence (e.g., obtaining two bright images and one dark image alternately), not a fixed sequence (e.g., obtaining one bright image and one dark image alternately). For example, the variable sequence may be operated depending on whether a designated condition is satisfied. For example, the designated condition may be related to the state (e.g., quality) of tracking using a tracking module in the wearable device 103, the user's input to the wearable device 103 (e.g., gesture, or input for a physical button), a specific software application or a setting in the wearable device 103, and/or the movement of the external electronic device 420. The electronic device and the method according to embodiments of the present disclosure may flexibly obtain the images required for each situation in the case that the first tracking and the second tracking are used through one camera. The electronic device and the method according to embodiments of the present disclosure may use the shooting mode corresponding to the performance of the tracking module or the user's usage scenario. Accordingly, the electronic device and the method according to the embodiments of the present disclosure may provide an effective user experience by using an appropriate shooting mode for each service.

Figure 5:
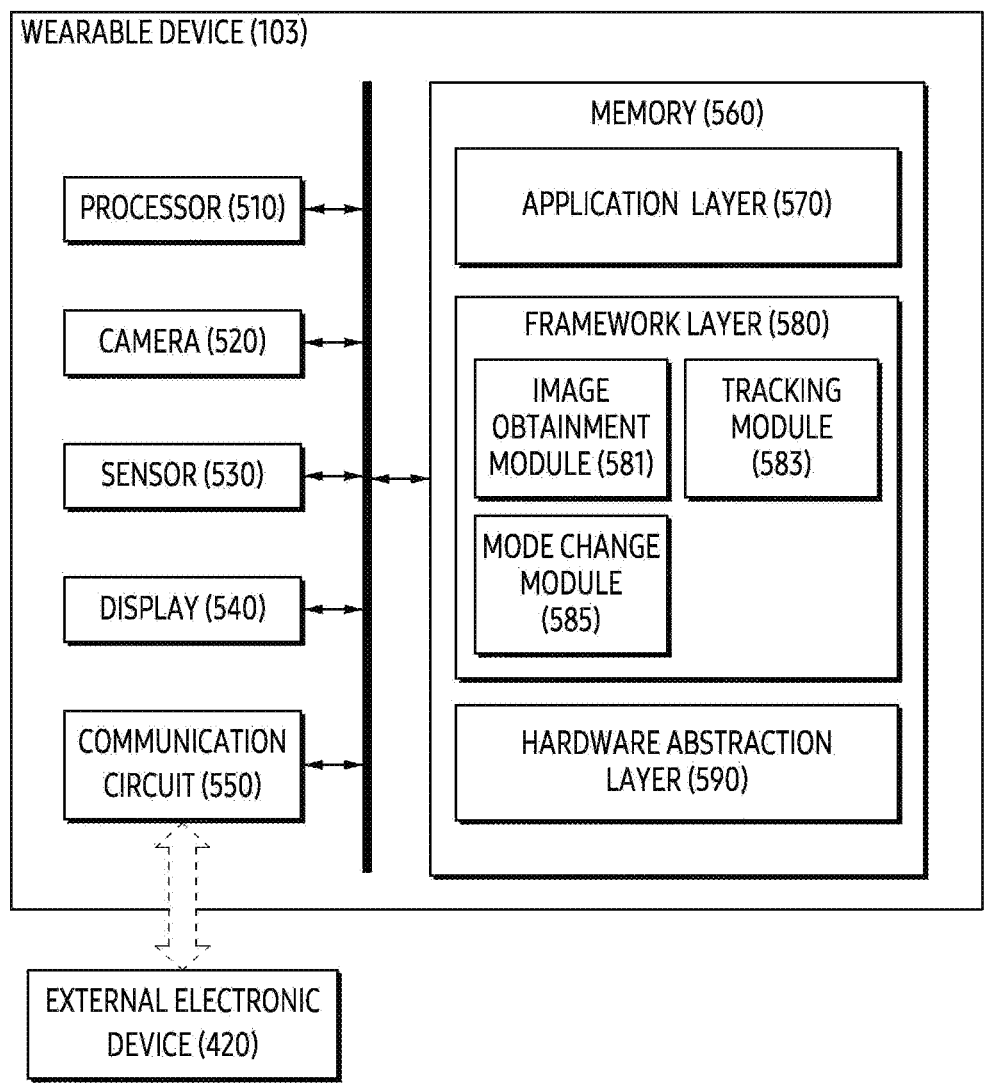
FIG. 5 illustrates an exemplary block diagram of a wearable device.

FIG. 5 illustrates an exemplary block diagram of a wearable device.

The wearable device 103 of FIG. 5 may be an example of an electronic device 101 of FIG. 1, the wearable device 103 of FIGS. 2A to 3B, or the wearable device 103 of FIG. 4. The external electronic device 420 of FIG. 5 may be the example of the external electronic device 420 of FIG. 4. In FIG. 5, the wearable device 103 wearable by a user is described as an example, but an embodiment of the present disclosure is not limited thereto. For example, wearable device 103 may represent the example of electronic device 101 of FIG. 1.

Referring to FIG. 5, an exemplary situation is illustrated in which the wearable device 103, and the external electronic device 420 are connected to each other based on a wired network and/or a wireless network. For example, the wired network may include a network such as the Internet, a local area network (LAN), a wide area network (WAN), or a combination thereof. For example, the wireless network may include a network such as long term evolution (LTE), 5g new radio (NR), wireless fidelity (WiFi), Zigbee, near field communication (NFC), Bluetooth, Bluetooth low-energy (BLE), or the combination thereof. Although the wearable device 103, and the external electronic device 420 are illustrated to be directly connected, the wearable device 103, and the external electronic device 420 may be indirectly connected through one or more router and/or access point (AP).

Referring to FIG. 5, according to an embodiment, the wearable device 103 may include at least one of a processor 510, a camera 520, a sensor 530, a display 540, a communication circuit 550, and memory 560. The camera 520, the sensor 530, the display 540, the communication circuit 550, and the memory 560 may be electronically and/or operably coupled with each other by a communication bus. Hereinafter, an operational combination of hardware components may mean that direct or indirect connection between the hardware components is established by wire or wirelessly so that a second hardware component is controlled by a first hardware component among the hardware components. Although illustrated based on different blocks, an embodiment is not limited thereto, and a portion of the hardware component (at least a portion of the processor 510, the memory 560, and the communication circuit 550) illustrated in FIG. 5 may be included in a single integrated circuit such as a system on a chip (SoC). A type and/or the number of the hardware component included in the wearable device 103 is not limited to those illustrated in FIG. 5. For example, the wearable device 103 may include only the portion of the hardware component illustrated in FIG. 5.

According to an embodiment, the processor 510 of the wearable device 103 may include the hardware component for processing data based on one or more instructions. For example, the hardware component for processing data may include an arithmetic and logic unit (ALU), a floating point unit (FPU), and a field programmable gate array (FPGA). As an example, the hardware component for processing data may include a central processing unit (CPU), a graphics processing unit (GPU), a digital signal processing (DSP), and/or a neural processing unit (NPU). The number of the processor 510 may be one or more. For example, the processor 510 may have a structure of a multi-core processor such as a dual core, a quad core, or a hexa core. The processor 510 of FIG. 5 may include a processor 120 of FIG. 1.

According to an embodiment, the camera 520 of the wearable device 103 may include one or more optical sensors (e.g., a charged coupled device (CCD) sensor and a complementary metal oxide semiconductor (CMOS) sensor) generating an electrical signal representing the color and/or brightness of light. A plurality of optical sensors included in the camera 520 may be disposed in the shape of 2 dimensional array. The camera 520 may generate an image including the plurality of pixels arranged in 2 dimensions, corresponding to light reaching the optical sensors of 2D array by substantially simultaneously obtaining the electrical signal of each of the plurality of optical sensors. For example, a photo data captured by using the camera 520 may mean one image obtained from the camera 520. For example, video data captured by using the camera 520 may mean a sequence of the plurality of images obtained according to a designated frame rate from the camera 520. The wearable device 103 according to an embodiment may further include a flash light disposed in a direction in which the camera 520 receives light and outputs light in the direction. The number of cameras 520 included in the wearable device 103 may be one or more as described above with reference to FIGS. 2A and 2B and/or 3A and 3B.

According to an embodiment, the sensor 530 of the wearable device 103 may include at least one sensor. For example, the sensor 530 may include at least the portion of the sensor module 176 of FIG. 1. For example, the sensor 530 may include an IMU (or IMU sensor). For example, the sensor 530 may include a gyro sensor, a gravity sensor, and/or an acceleration sensor.

According to an embodiment, the display 540 of the wearable device 103 may output visualized information to the user. The number of the display 540 included in the wearable device 103 may be one or more. For example, the display 540 may output visualized information to the user by being controlled by the processor 510 and/or the graphics processing unit (GPU) (not illustrated). The display 540 may include a flat panel display (FPD), and/or electronic paper. The flat panel display (FPD) may include a liquid crystal display (LCD), a plasma display panel (PDP), a digital mirror device (DMD), one or more light emitting diodes (LEDs), and/or a micro LED. The light emitting diode (LED) may include an organic LED (OLED). The display 540 of FIG. 5 may include a display module 160 of FIG. 1.

According to an embodiment, the communication circuit 550 of the wearable device 103 may include hardware for supporting transmission and/or reception of the electrical signal between the wearable device 103 and the external electronic device 520. For example, the communication circuit 550 may include at least one of a modulator and demodulator (MODEM), an antenna, and an optic/electronic (O/E) converter. The communication circuit 550 may support the transmission and/or reception of the electrical signal based on various type of communication means such as Ethernet, Bluetooth (BT), Bluetooth low energy (BLE), ZigBee, long term evolution (LTE), and 5G new radio (NR). The communication circuit 550 of FIG. 5 may include a communication module 190 of FIG. 1 and/or an antenna module 197.

According to an embodiment, the memory 560 of the wearable device 103 may include the hardware component for storing data and/or an instruction inputted to the processor 510 and/or outputted from the processor 510. For example, the memory 560 may include a volatile memory such as a random-access memory (RAM), and/or a nonvolatile memory such as a read-only memory (ROM). For example, the volatile memory may include at least one of dynamic RAM (DRAM), static RAM (SRAM), Cache RAM, and pseudo SRAM (PSRAM). For example, the nonvolatile memory may include at least one of a programmable ROM (PROM), an erasable PROM (EPROM), an electrically erasable PROM (EEPROM), a flash memory, a hard disk, a compact disk, and an embedded multimedia card (eMMC). The memory 560 of FIG. 5 may include memory 130 of FIG. 1.

Although not illustrated, according to an embodiment, the wearable device 103 may include an output means for outputting information in a different shape other than a visualized shape. For example, the wearable device 103 may include a speaker for outputting an acoustic signal. For example, the wearable device 103 may include a motor for providing haptic feedback based on vibration.

Referring to FIG. 5, within the memory 560 of the wearable device 103, according to an embodiment, one or more instructions (or commands) representing calculation and/or operation to be performed by the processor 510 of the wearable device 103 on data may be stored. A set of one or more instructions may be referred to as a program, firmware, operating system, process, routine, sub-routine and/or application. Hereinafter, an installation of the application within the electronic device (e.g., the wearable device 103) may mean that one or more instructions provided in the shape of the application are stored in the memory 560 and the one or more applications are stored in an executable format (e.g., a file with an extension designated by the operating system of the wearable device 103). According to an embodiment, the wearable device 103 may perform the operation of FIGS. 6, and 9 by executing one or more instructions stored in the memory 560.

Referring to FIG. 5, according to an embodiment, programs installed on the wearable device 103 may be classified as any one of different layers including an application layer 570, a framework layer 580, and/or a hardware abstraction layer (HAL) 590 based on a target. For example, within the hardware abstraction layer 590, the programs (e.g., driver) designed to target hardware (e.g., the camera 520, the display 540, and/or the communication circuit 550) of wearable device 103 may be classified. For example, within the framework layer 580, the programs (e.g., an image obtainment module 581, a tracking module 583, and/or a mode change module 585) designed to target at least one of the hardware abstraction layer 590 and/or the application layer 570 may be classified. The programs classified as the framework layer 580 may provide an executable application programming interface (API) based on another program.

Referring to FIG. 5, according to an embodiment, within the application layer 570, a program designed to target the user controlling the wearable device 103 may be classified. For example, the program classified as the application layer 570 may include at least one of application providing an XR environment. However, embodiment of the present disclosure is not limited thereto. For example, the program classified as the application layer 570 may call the API and cause the execution of function supported by programs classified as the framework layer 580.

Referring to FIG. 5, according to an embodiment, the wearable device 103 may obtain the image through the camera 520 based on execution of the image obtainment module 581 within the framework layer 580. For example, the wearable device 103 may obtain the image through the image obtainment module 581 based on a set mode. For example, the mode may include a first mode, a second mode, and a third mode. For example, the first mode may represent a shooting mode in which at least one first image for the first tracking and at least one second image for the second tracking are alternately obtained with the same FPS (or the number of images). In other words, the first mode may represent the shooting mode in which the first scheme and the second scheme are alternately used with the same frequency. The first mode may be referred to as a basic mode. For example, the second mode may represent the shooting mode in which the at least one first image for the first tracking and the at least one second image for the second tracking are alternately obtained with different FPS (or the number of images). In other words, the second mode may represent the shooting mode in which the first scheme and the second scheme are alternately used with a different frequency. For example, the third mode may represent the shooting mode in which one of at least one first image for the first tracking and at least one second image for the second tracking is obtained. In other words, the third mode may represent the shooting mode using one of the first scheme and the second scheme. The wearable device 103 may check whether the image information is data for the first tracking or data for the second tracking from the image information obtained from the camera 520 through the image obtainment module 581. For example, the image information may indicate visual information and an attribute of the image information to an external environment. For example, the attribute may include a bright image (or an image obtained through an auto exposure) or a dark image (or an image obtained through a fixed exposure).

Referring to FIG. 5, according to an embodiment, the wearable device 103 may perform at least one tracking based on execution of the tracking module 583 in the framework layer 580. For example, the at least one tracking may include head tracking, hand tracking, and/or controller tracking. However, an embodiment of the present disclosure is not limited thereto. For example, the wearable device 103 may identify quality for each of the at least one tracking based on execution of the tracking module 583. For example, the quality may be identified based on feature values in the image obtained for each of the at least one tracking. For example, the feature values may include a boundary or a point of an external object (or an external electronic device). For example, the feature values may include a boundary line or a point of light source included in the external electronic device. For example, the quality may be compared with at least one reference value set for each of the tracking such as, for example, head tracking, hand tracking, and/or controller tracking. The mode may be selected based on a comparison of the quality with the at least one reference value.

Referring to FIG. 5, according to an embodiment, the wearable device 103 may perform changing of the mode based on execution of the mode change module 585 in the framework layer 580. For example, the wearable device 103 may perform changing of the mode according to whether a designated condition is satisfied. For example, the designated condition may be related to the quality of each tracking of the tracking module 583, a user's input to the wearable device 103 (e.g., an input for a gesture, or a physical button), a setting within a specific software application or the wearable device 103, or a movement of the external electronic device 420.

Referring to FIG. 5, according to an embodiment, the external electronic device 420 may be connected to the wearable device 103. The external electronic device 420 may be used to provide an input to the user's wearable device 103 after being connected to the wearable device 103. For example, the external electronic device 420 may include a button. For example, the button may be used to change the mode of the wearable device 103.

Figure 6:
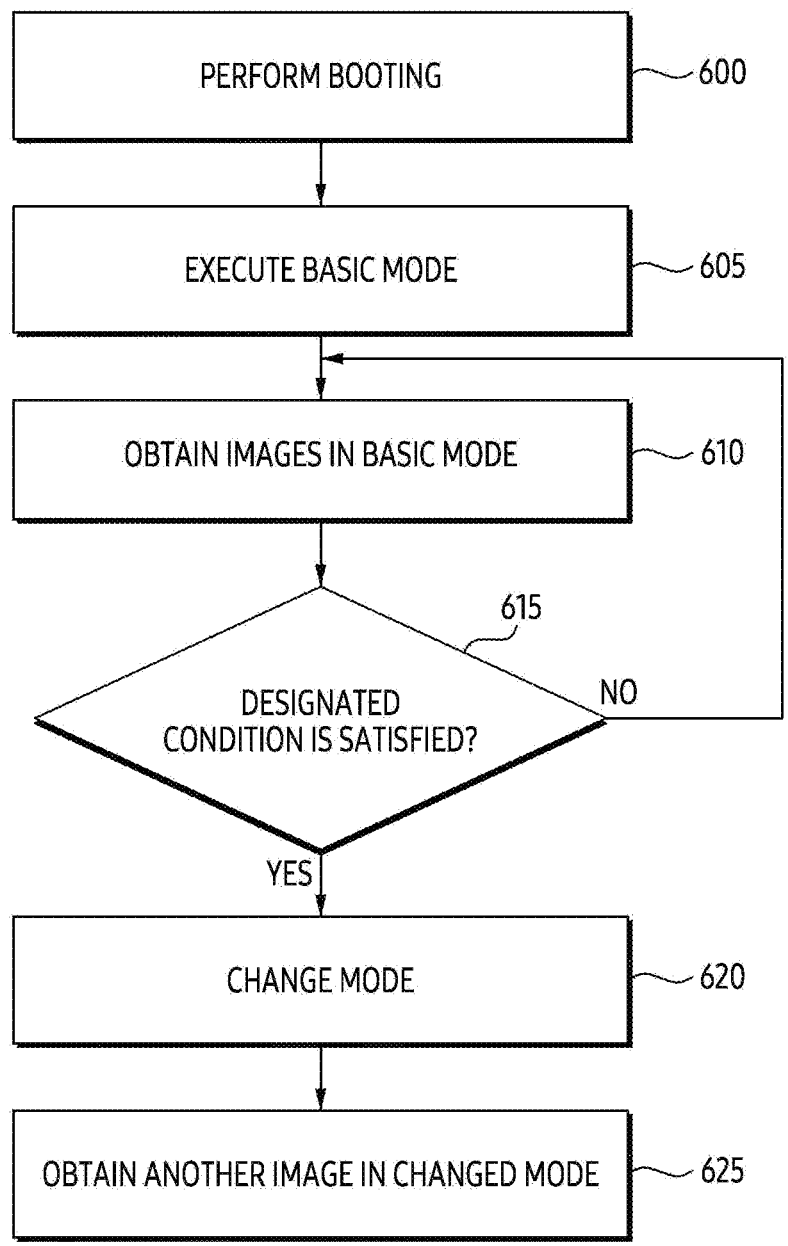
FIG. 6 illustrates an example of an operation flow of a method of obtaining images according to a mode of a wearable device.

FIG. 6 illustrates an example of an operation flow of a method of obtaining images according to a mode of a wearable device.

At least a portion of the method of FIG. 6 may be performed by the wearable device 103 of FIG. 5. For example, at least the portion of the method may be controlled by a processor 510 of the wearable device 103. In the following embodiment, each of operations may be performed sequentially, but is not necessarily performed sequentially. For example, the order of each of operations may be changed, and at least two operations may be performed in parallel.

In an operation 600, according to an embodiment, the wearable device 103 may perform booting. For example, the wearable device 103 may perform the booting based on an input. For example, the input may include the input of a user wearing the wearable device 103 or input of a physical button for booting of the wearable device 103.

In an operation 605, according to an embodiment, the wearable device 103 may execute a basic mode. For example, the wearable device 103 may execute the basic mode based on the booting. For example, the basic mode may be referred to as a first mode. For example, the basic mode may refer to a shooting mode in which one image for tracking (or a first tracking) the user's body portion and one image for tracking (or a second tracking) the external electronic device 420 connected to the wearable device 103 are alternately obtained.

In an operation 610, according to an embodiment, the wearable device 103 may obtain images in the basic mode. For example, the wearable device 103 may obtain the images set to a designated FPS. For example, the designated FPS may indicate the number of images (or frames) per hour set for the camera 520 of the wearable device 103. For example, the designated FPS may be a value set for performance of the camera 520 or the wearable device 103.

For example, the images based on the designated FPS may include at least one first image for the first tracking and at least one second image for the second tracking. For example, the number of the at least one first image(s) in the images obtained within the basic mode may correspond to the number of the at least one second image(s) in the images. In other words, the FPS of the at least one first image(s) may be the same as the FPS of the at least one second image(s). Referring to the above, in the basic mode, the wearable device 103 may sequentially obtain the image for the first tracking, the image for the second tracking, the image for the first tracking, the image for the second tracking, and so forth through or using the camera 520.

For example, the at least one first image may have a first attribute, and the at least one second image may have a second attribute different from the first attribute. For example, each of the first attribute and the second attribute may include a first brightness and a second brightness. For example, the first brightness is brighter than the second brightness. For example, the at least one first image having the first brightness may be used to obtain first feature values for the first tracking. For example, the first feature values may include a boundary or a point of an external object for the first tracking. Also, for example, the at least one second image having the second brightness may be used to obtain second feature values for the second tracking. For example, the second feature values may include light sources of the external electronic device 420 for the second tracking.

In an operation 615, according to an embodiment, the wearable device 103 may identify whether a designated condition is satisfied. For example, the wearable device 103 may identify whether the designated condition for changing the mode (or a shooting mode) of the wearable device 103 is satisfied. For example, the designated condition may be related to quality of each of the tracking (e.g., the first and second tracking), the user's input to the wearable device 103 (e.g., gesture, or input for a physical button), a setting in a specific software application or the wearable device 103, or the movement of the external electronic device 420. The shooting mode may include a first mode (or the basic mode), a second mode, and a third mode. For example, the first mode may represent the shooting mode in which at least one first image for the first tracking and at least one second image for the second tracking are alternately obtained with the same FPS (or the number of image). The first mode may be referred to as the basic mode. For example, the second mode may represent the shooting mode in which the at least one first image for the first tracking and the at least one second image for the second tracking are alternately obtained with different FPS (or the number of image). For example, the third mode may represent the shooting mode in which one of at least one first image for the first tracking and at least one second image for the second tracking is obtained.

According to an embodiment, the wearable device 103 may identify the quality of each of the tracking based on feature values. The quality may be referred to as pose quality. For example, the wearable device 103 may identify a first quality of the first tracking based on the first feature values. For example, the wearable device 103 may identify a second quality of the second tracking based on the second feature values.

According to an embodiment, the wearable device 103 may change the mode (or shooting mode) of the wearable device 103 based on a comparison result between the quality of each of the tracking and reference value of each of the tracking. For example, the wearable device 103 may compare the first quality with a first reference value set for the first tracking. Also, for example, the wearable device 103 may compare the second quality with the second reference value set for the second tracking. The first reference value set may include at least one reference value. The second reference value set may include at least one reference value. For example, it is assumed that the first reference value set includes the first reference value and the second reference value set includes the second reference value. For example, the wearable device 103 may execute the first mode in the case that the first quality is higher than or equal to the first reference value and the second quality is higher than or equal to the second reference value. For example, the wearable device 103 may execute the first mode in the case that the first quality is lower than the first reference value and the second quality is lower than the second reference value. For example, the wearable device 103 may execute the second mode in the case that the first quality is higher than or equal to the first reference value and the second quality is lower than the second reference value, or in the case that the first quality is lower than the first reference value and the second quality is higher than or equal to the second reference value. For example, in the second mode executed in response to the case where the first quality is higher than or equal to the first reference value and the second quality is lower than the second reference value, the number (or FPS) of images for the second tracking may be greater (or higher) than the number (or FPS) of images for the first tracking. Additionally and/or alternatively, for example, in the second mode executed in response to the case where the first quality is lower than the first reference value and the second quality is higher than or equal to the second reference value, the number (or FPS) of images for the first tracking may be greater (or higher) than the number (or FPS) of images for the second tracking. In the above example, a case where each of the first reference value set and the second reference value set includes one reference value is described, but an embodiment of the present disclosure is not limited thereto. For example, each of the first reference value set and the second reference value set may include a plurality of reference values. Based on the plurality of reference values, the number (or FPS) of the images for a specific tracking obtained through the camera 520 may be adjusted. For example, it is assumed that the first reference value set includes the plurality of reference values (e.g., a first reference value and a second reference value). In the case that the first quality is lower than a first reference value, the wearable device 103 may obtain the images for the first tracking based on a first FPS. In the case that the first quality is higher than or equal to the first reference value and lower than the second reference value, the wearable device 103 may obtain the images for the first tracking based on a second FPS smaller than the first FPS. At this time, each of the first FPS and the second FPS may be a value (i.e., in the case that the number of images for the first tracking is greater than the number of images for the second tracking) higher than the FPS of the image for the second tracking.

According to an embodiment, the wearable device 103 may change the mode based on the input. For example, the wearable device 103 may change the mode based on a gesture set in the wearable device 103. For example, the wearable device 103 may include a first gesture for the first mode, a second gesture for the second mode, and a third gesture for the third mode. Additionally and/or alternatively, for example, the wearable device 103 may change the mode based on the input for the physical button included in the wearable device 103. Specific details related to this are described in FIG. 8B below.

According to an embodiment, the wearable device 103 may change the mode based on the executed software application or a setting in the wearable device 103. For example, the wearable device 103 may recognize the mode set in the software application in response to executing the software application. The wearable device 103 may change the shooting mode of the wearable device 103 to the set mode. Further, for example, the wearable device 103 may recognize the set mode of according to the setting in the wearable device 103. For example, the setting in the wearable device 103 may be changed based on at least a portion of the user's input. The wearable device 103 may change the shooting mode to the set mode. For example, when the software application (e.g., a game) that requires a relatively large amount of movement of the external electronic device 420 (or a controller) is executed or the setting in the wearable device 103 is changed, the wearable device 103 may change the shooting mode from the first mode to the second mode. At this time, the second mode may represent the shooting mode in which the number of images for the first tracking is smaller than the number of images for the second tracking. This may be to increase the accuracy or response speed of tracking for the movement of the external electronic device 420. Specific details related to this are described in FIG. 8A below.

According to an embodiment, the wearable device 103 may change the shooting mode based on the movement of the external electronic device 420 (or a controller) connected to the wearable device 103. For example, the wearable device 103 may change the shooting mode from the first mode to the second mode based on identifying that the movement is lower than a reference frequency. The second mode executed in response to the case where the movement is lower than the reference frequency may represent the shooting mode in which the number of images for the first tracking is larger than the number of images for the second tracking. This is because when the movement is lower than the reference frequency, the second tracking of the external electronic device 420 is not required. Specific details related to this are described in FIG. 8A below.

According to an embodiment, the wearable device 103 may recognize the movement of the external electronic device 420 based on a sensor 530. For example, the wearable device 103 may obtain information on the movement of the external electronic device 420 through the sensor 530 (e.g., an IMU sensor). The wearable device 103 may change the shooting mode based on the movement identified based on the information.

Referring to the above, the wearable device 103 may identify whether the designated condition for changing the shooting mode is satisfied. For example, the wearable device 103 may periodically (or aperiodically) identify whether the designated condition is satisfied from the timing of obtaining the images in the operation 610. Additionally and/or alternatively, for example, in the case that an event occurs after obtaining the images, the wearable device 103 may identify whether the designated condition is satisfied. For example, the event may include execution of the specific software application. Additionally and/or alternatively, for example, when a signal requesting a mode change is received from the external electronic device 420 (or a controller) after obtaining the images, the wearable device 103 may identify whether the designated condition is satisfied.

In the operation 615, in the case that the designated condition is satisfied, the wearable device 103 may perform an operation 620. In contrast, in operation 615, in the case that the designated condition is not satisfied, the wearable device 103 may perform operation 610. For example, the wearable device 103 may obtain images in the current shooting mode (e.g., the basic mode) and perform a tracking based on the images. The tracking may include the first tracking and the second tracking. In other words, by returning to operation 610, the wearable device 103 may obtain images without changing the basic mode (or while the basic mode is maintained).

In the operation 620, the wearable device 103 according to an embodiment may change the mode. For example, the wearable device 103 may recognize the mode to be changed based on the designated condition. The wearable device 103 may change the shooting mode from the basic mode (or the first mode) to the recognized mode.

In the operation 625, the wearable device 103 according to an embodiment may obtain another image in the changed mode. For example, the wearable device 103 may obtain the another images based on the FPS (or the number of images) set within the changed mode.

For example, in the case that the changed mode is the second mode, the another images may include at least one third image for the first tracking and at least one fourth image for the second tracking. For example, the number (or FPS) of the at least one third image(s) may be different from the number (or FPS) of the at least one fourth image(s).

Further, for example, in the case that the changed mode is the third mode, the another images may include one of at least one third image for the first tracking and at least one fourth image for the second tracking. For example, in the case that the first tracking is unnecessary (e.g., when the user's head is fixed), the another images may include the at least one fourth image for the second tracking among at least one third image for the first tracking and at least one fourth image for the second tracking. In contrast, in the case that the second tracking is unnecessary (e.g., when the user does not grip the external electronic device 420), the another images may include the at least one third image for the first tracking among the at least one third image for the first tracking and the at least one fourth image for the second tracking.

Figure 7A:
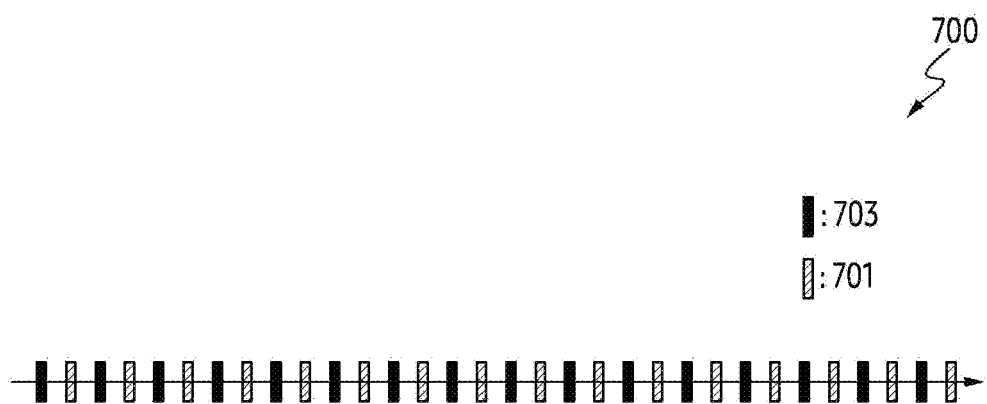
FIGS. 7A, 7B, and 7C illustrate an example of a method of obtaining images according to a mode of a wearable device.
Figure 7B:
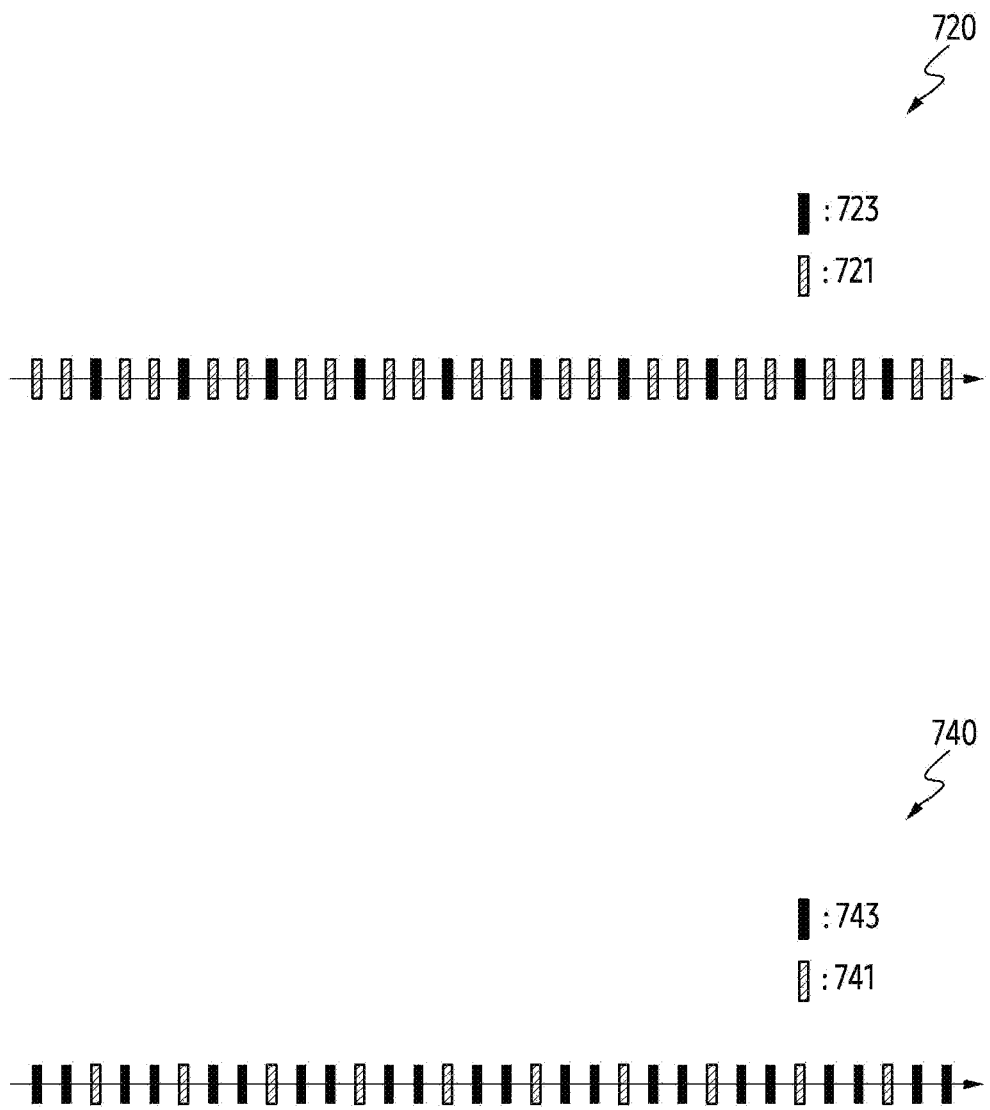
Figure 7C:
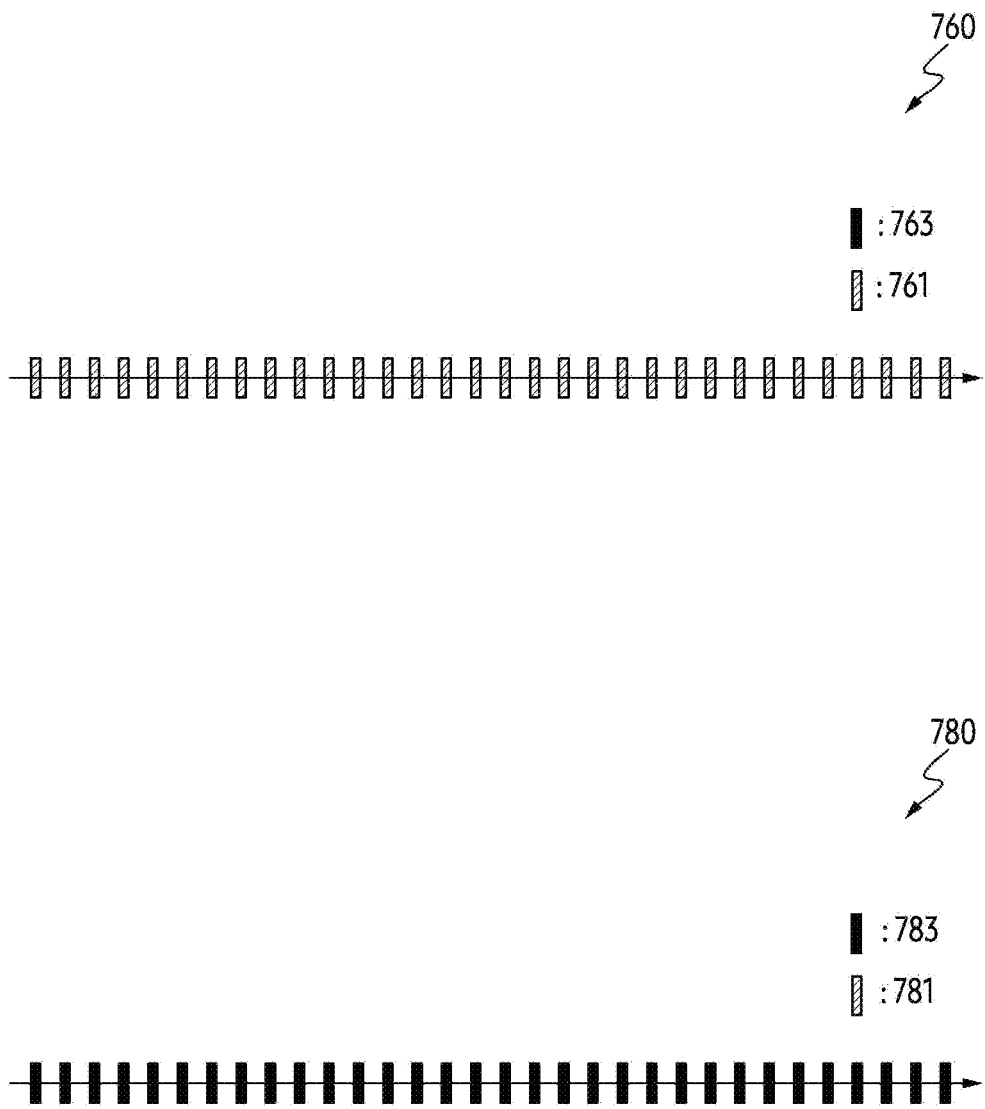

FIG. 7A to 7C illustrate an example of a method of obtaining images according to a mode of a wearable device.

The mode of FIGS. 7A to 7C may represent a shooting mode of the wearable device 103. For example, the mode may include a first mode, a second mode, and a third mode. FIG. 7A illustrates an example 700 of a method of obtaining images based on the first mode. FIG. 7B illustrates examples 720, 740 of a method of obtaining images based on the second mode. FIG. 7C illustrates examples 760, 780 of a method of obtaining images based on the third mode.

Referring to the example 700 of FIG. 7A, the wearable device 103 may obtain images in the first mode. For example, the wearable device 103 may obtain the images through a camera 520 in the first mode. For example, the images obtained in the first mode may include first images 701 for the first tracking and second images 703 for the second tracking. For example, the first images 701 may be a frame for the first tracking (e.g., a head tracking or a hand tracking). For example, the second images 703 may be a frame for the second tracking (e.g., a controller tracking). For example, the first images 701 for the first tracking may have a first attribute. For example, the first attribute may include a first brightness. For example, the second images 703 for the second tracking may have a second attribute different from the first attribute. For example, the second attribute may include a second brightness darker than the first brightness. In the example 700 of FIG. 7A, the example in which the wearable device 103 alternately obtains the image for the first tracking and the image for the second tracking is described, but an embodiment of the present disclosure is not limited thereto. For example, the wearable device 103 may alternately obtain two images for the first tracking and two images for the second tracking. Even in this case, an FPS of the first images 701 may be the same as an FPS of the second images 703. In FIG. 7A, for convenience of description, the example of the first images 701 and the second images 703 having the same length with respect to time is illustrated, but an embodiment of the present disclosure is not limited thereto. For example, since each of the first images 701 having the first attribute uses the first scheme, which requires relatively more exposure time compared to each of the second images 703 having the second attribute, a time length (or length of time) required to obtain each of the first images 701 may be shaped longer than the time length (or length of time) required to obtain each of the second images 703.

Referring to the example 720 of FIG. 7B, the wearable device 103 may obtain images in the second mode. For example, the wearable device 103 may obtain the images through the camera 520 in the second mode. For example, the images obtained in the second mode may include first images 721 for the first tracking and second images 723 for the second tracking. For example, the first images 721 may be a frame for the first tracking (e.g., a head tracking or a hand tracking). For example, the second images 723 may be a frame for the second tracking (e.g., a controller tracking). For example, the first images 721 for the first tracking may have a first attribute. For example, the first attribute may include a first brightness. For example, the second images 723 for the second tracking may have a second attribute different from the first attribute. For example, the second attribute may include a second brightness darker than the first brightness. In the second mode of the example 720, an FPS of the first images 721 may be higher than that of the second images 723. In other words, in the second mode of the example 720, the wearable device 103 may obtain the images including a larger number of first images 721 than the number of the second images 723. In the example 720 of FIG. 7B, the case where the FPS of the first images 721 is twice the FPS of the second images 723 is illustrated, but an embodiment of the present disclosure is not limited thereto. For example, the FPS of the first images 721 may be three or four times the FPS of the second images 723. Further, for example, the FPS of the first images 721 may be 1.5 times the FPS of the second images 723. In this case, the wearable device 103 may alternately obtain three first images 721 and two second images 723. In FIG. 7B, for convenience of description, the example of the first images 721 and the second images 723 having the same length with respect to time is illustrated, but an embodiment of the present disclosure is not limited thereto. For example, since each of the first images 721 having the first attribute uses the first scheme, which requires relatively more exposure time compared to each of the second images 723 having the second attribute, time length (e.g., length of time) required to obtain each of the first images 721 may be shaped longer than time length (e.g., length of time) required to obtain each of the second images 723.

Referring to the example 740 of FIG. 7B, the wearable device 103 may obtain images in the second mode. For example, the wearable device 103 may obtain the images through the camera 520 in the second mode. For example, the images obtained in the second mode may include first images 741 for the first tracking and second images 743 for the second tracking. For example, the first images 741 may be a frame for the first tracking (e.g., a head tracking or a hand tracking). For example, the second images 743 may be a frame for the second tracking (e.g., a controller tracking). For example, the first images 741 for the first tracking may have a first attribute. For example, the first attribute may include a first brightness. For example, the second images 743 for the second tracking may have a second attribute different from the first attribute. For example, the second attribute may include a second brightness darker than the first brightness. In the second mode of example 740, the FPS of the first images 741 may be lower than the FPS of the second images 743. In other words, the wearable device 103 may obtain the images including fewer first images 741 than the second images 743 in the second mode of the example 740. In the example 740 of FIG. 7B, the case where the FPS of the second images 743 is twice the FPS of the first images 741 is illustrated, but an embodiment of the present disclosure is not limited thereto. For example, the FPS of the second images 743 may be three or four times the FPS of the first images 741. Further, for example, the FPS of the second images 743 may be 1.5 times the FPS of the first images 741. In this case, the wearable device 103 may alternately obtain three second images 743 and two first images 741. In FIG. 7B, for convenience of description, the example of the first images 741 and the second images 743 having the same length with respect to time is illustrated, but an embodiment of the present disclosure is not limited thereto. For example, since each of the first images 741 having the first attribute uses the first scheme, which requires relatively more exposure time compared to each of the second images 743 having the second attribute, time length (e.g., length of time) required to obtain each of the first images 741 may be shaped longer than time length (e.g., length of time) required to obtain each of the second images 743.

Referring to 7C, the wearable device 103 may obtain images in the third mode. For example, the wearable device 103 may obtain the images through the camera 520 in the third mode. The images obtained in the third mode of an example 760 may include first images 761 for the first tracking. The images obtained in the third mode of example 760 may not include second images 763 for the second tracking. For example, the first images 761 may be a frame for the first tracking (e.g., a head tracking or a hand tracking). For example, the second images 763 may be a frame for the second tracking (e.g., a controller tracking), although no frame for the second images 763 is shown in example 760. For example, the first images 761 for the first tracking may have a first attribute. For example, the first attribute may include first brightness. In contrast, the images obtained in the third mode of the example 780 may include second images 783 for the second tracking. The images obtained in the third mode of the example 780 may not include first images 781 for the first tracking. For example, the first images 781 may be a frame for the first tracking (e.g., a head tracking or a hand tracking), although no frame for the first images 781 is shown in example 780. For example, the second images 783 may be a frame for the second tracking (e.g., a controller tracking). For example, the second images 783 for the second tracking may have a second attribute different from the first attribute. For example, the second attribute may include second brightness darker than the first brightness. In FIG. 7C, for convenience of description, the example of the first images 761 or 781 and the second images 763 or 783 having the same length with respect to time is illustrated, but an embodiment of the present disclosure is not limited thereto. For example, since each of the first images 761 or 781 having the first attribute uses the first scheme, which requires relatively more exposure time compared to each of the second images 763 or 783 having the second attribute, time length (e.g., length of time) required to obtain each of the first images 761 or 781 may be shaped longer than time length (e.g., length of time) required to obtain each of the second images 763 or 783.

Referring to the above, the wearable device 103 may execute or change the mode of the wearable device 103 based on a designated condition. The examples of execution or change of the mode are as follows. However, the electronic device and the method using a variable sequence according to embodiments of the present disclosure are not limited to the following examples.

For example, the wearable device 103 may execute the first mode in response to booting of the wearable device 103. Additionally and/or alternatively, for example, in the case that the wearable device 103 is set to use a shooting sequence fixed in the wearable device 103, the wearable device 103 may execute the first mode. Additionally and/or alternatively, for example, the wearable device 103 may execute the first mode in the case that a first quality of the first tracking is higher than or equal to a first reference value and a second quality of the second tracking is higher than or equal to a second reference value. Additionally and/or alternatively, for example, the wearable device 103 may execute the first mode in the case that the first quality is lower than the first reference value and the second quality is lower than the second reference value.

For example, the first quality may be identified based on first feature values obtained from each of the first images (e.g., the first images 701 of FIG. 7A, the first images 721 and 741 of FIG. 7B, and the first images 761 and 781 of FIG. 7C) for the first tracking. For example, the first feature values may include a boundary or a point of an external object included in each of the first images for the first tracking. For example, the wearable device 103 may identify the first quality based on a variation of the position of the boundary line (or point) between the first images. For example, the second quality may be identified based on second feature values obtained from each of the second images (e.g., the second images 703 of FIG. 7A, the second images 723 and 743 of FIG. 7B, and the second images 763 and 783 of FIG. 7C) for the second tracking. For example, the second feature values may include light sources of the external electronic device 420 included in each of the second images for the second tracking. For example, the wearable device 103 may identify the second quality based on a variation of the positions of the light sources between the second images. Referring to the above, when there are many external objects capable of recognizing the boundary in the FoV of the camera 520 of the wearable device 103, the first quality of the first tracking may be increased. In contrast, when an environment (e.g., an area that does not contain any pattern, such as a white wall) in which it is difficult to recognize the boundary within the FoV (e.g., an area that does not contain any patterns, such as a white wall), the first quality may be lowered. Alternatively and/or additionally, when it is difficult to recognize that the external electronic device 420 as the external electronic device 420 is positioned outside of the FoV, the second quality of the second tracking may be lowered.

For example, it is assumed that the external electronic device 420 is positioned within the FoV of the camera 520 of the wearable device 103 in an environment in which it is difficult to recognize the boundary. The wearable device 103 may recognize the low first quality as it is difficult to recognize the boundary, and the wearable device 103 may recognize that the high second quality as the external electronic device 420 is positioned in the FoV. In the case that the second quality is higher than or equal to a reference value (e.g., a second reference value) of the second tracking, the wearable device 103 may execute (or change) the second mode to increase the first quality. At this time, in the executed second mode, the FPS of the image for the first tracking may be higher than the FPS of the image for the second tracking.

For example, in the case that the external electronic device 420 is not used for a designated time or the external electronic device 420 does not move, the wearable device 103 may reduce the number of images obtained for the second tracking and increase the number of images for the first tracking. The wearable device 103 may execute the second mode. At this time, in the executed second mode, the FPS of the image for the first tracking may be higher than the FPS of the image for the second tracking. Thereafter, the wearable device 103 may execute the first mode from (e.g., subsequent to) the second mode, because the wearable device 103 detects the movement of the external electronic device 420 based on an input to the wearable device 103 or a sensor. In the above example, an example of changing from the second mode to the first mode is described, but an embodiment of the present disclosure is not limited thereto.

For example, the wearable device 103 may change from the second mode of example 740 to the second mode of example 720.

For example, in the case that the external electronic device 420 is positioned on the outside of the FoV, the wearable device 103 may execute the second mode. At this time, in the executed second mode, as in the example 740, the FPS of the image for the second tracking may be higher than the FPS of the image for the first tracking. This may be to recognize the external electronic device 420 positioned outside of the FoV and perform the second tracking of the external electronic device 420.

Additionally and/or alternatively, for example, the wearable device 103 may execute the second mode to increase the accuracy or response speed of the second tracking to the external electronic device 420 required by the execution or service of a specific software application. At this time, in the executed second mode, as in the example 740, the FPS of the image for the second tracking may be higher than the FPS of the image for the first tracking.

For example, the wearable device 103 may execute the third mode based on a setting of a specific software application or service. For example, the wearable device 103 may execute the third mode based on the setting for activating an input using only the external electronic device 420. At this time, the executed third mode may represent the shooting mode in which the images for the second tracking are obtained, as in an example 780. Additionally and/or alternatively, for example, based on the setting being deactivated, the wearable device 103 may change from the third mode to the first mode, which is the basic mode. For example, the wearable device 103 may execute the third mode based on the setting indicating that the external electronic device 420 is not used. At this time, the executed third mode may represent the shooting mode in which the images for the first tracking are obtained, as in an example 760.

Figure 8A:
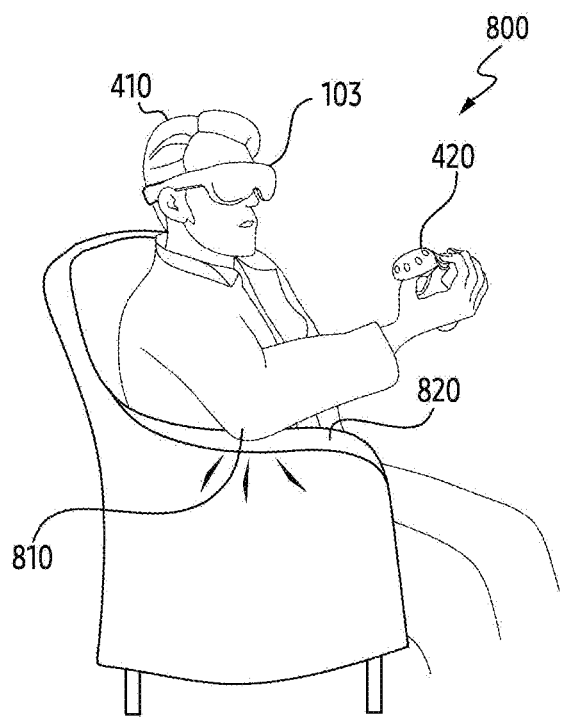
FIG. 8A illustrates an example of a method of changing a mode of a wearable device based on a movement of an external electronic device.
Figure 8A:
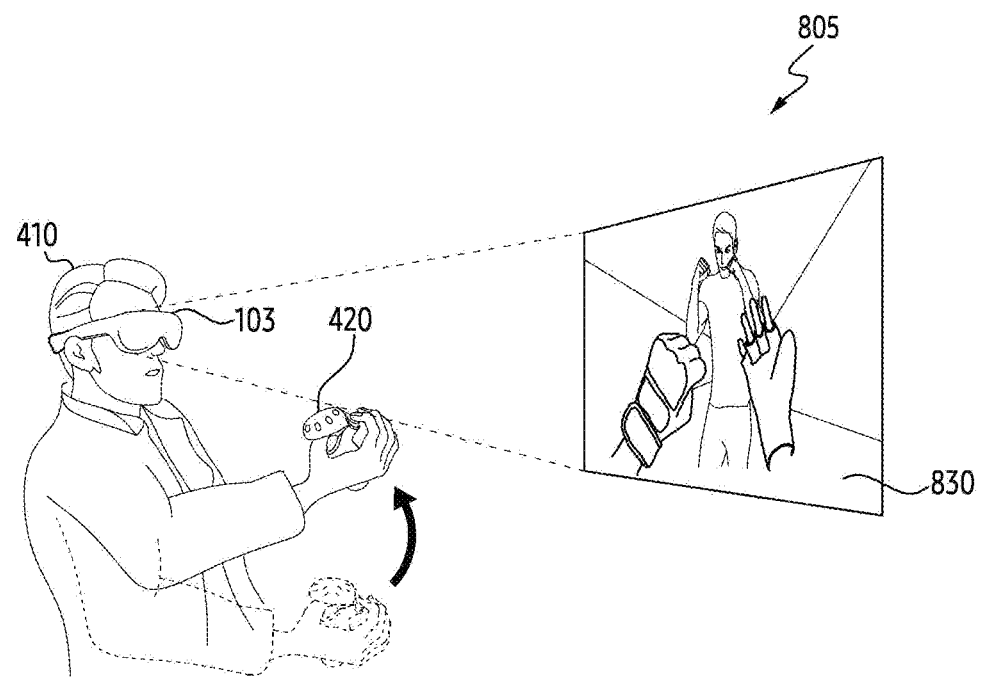

FIG. 8A illustrates an example of a method of changing a mode of a wearable device based on a movement of an external electronic device.

The external electronic device 420 of FIG. 8A may represent the external electronic device 420 of FIG. 4 and the external electronic device 420 of FIG. 5. The wearable device 103 of FIG. 8A may represent the electronic device 101 of FIG. 1, the wearable device 103 of FIGS. 2A, 2B, 3A, and 3B, the wearable device 103 of FIG. 4, and the wearable device 103 of FIG. 5. For example, wearable device 103 may be connected to the external electronic device 420. The external electronic device 420 may be used to provide an input to the wearable device 103. For example, the input may be caused by a user 410.

FIG. 8A illustrates examples 800 and 805 of changing the mode based on the movement of the external electronic device 420. The mode may represent a shooting mode in which the wearable device 103 obtains images for tracking through the camera 520.

Referring to an example 800, the user 410 may wear the wearable device 103 and may grip the external electronic device 420. For example, the user 410 may sit in a chair while wearing the wearable device 103. At this time, the body portion 810 of the user 410 may be supported by an external object 820. For example, the body portion 810 may include an elbow of a right hand to which the external electronic device 420 is gripped. For example, the external object 820 may include an armrest of the chair. In the case that the body portion 810 is supported by the external object 820, the wearable device 103 may expect that the movement of the external electronic device 420 is small. For example, the wearable device 103 may expect that the movement is small based on recognizing that the body portion 810 of the user 410 is supported by the external object 820. Accordingly, the wearable device 103 may change the mode. For example, the wearable device 103 may execute the second mode based on identifying that the movement is lower than reference frequency while the first mode, which is the basic mode, is being executed. At this time, in the executed second mode, as in example 720, an FPS of the image for the first tracking may be higher than an FPS of the image for the second tracking.

Referring to an example 805, the user 410 may wear the wearable device 103 and may grip the external electronic device 420. For example, the user 410 may use a virtual environment 830 provided by the wearable device 103. For example, the virtual environment 830 may include a game that requires a large movement of the external electronic device 420 or a high level of accuracy or response speed of the second tracking for the movement. For example, in the case that a software application providing the virtual environment 830 is executed, the wearable device 103 may change the mode. For example, the wearable device 103 may execute the second mode based on identifying execution of the software application providing the virtual environment 830 while the first mode, which is the basic mode, is being executed. At this time, in the executed second mode, as in example 740, an FPS of the image for the second tracking may be higher than an FPS of the image for the first tracking.

Figure 8B:
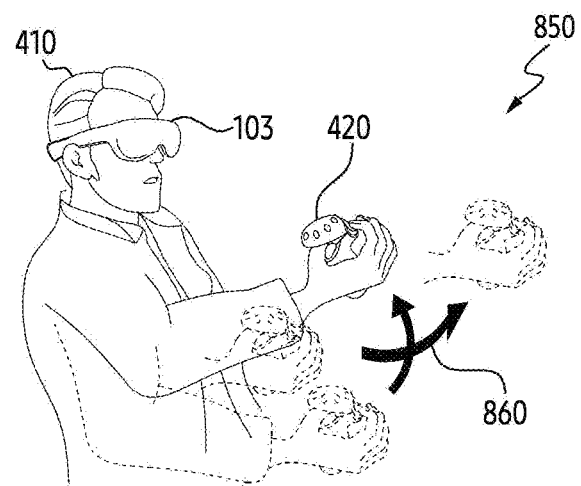
FIG. 8B illustrates an example of a method of changing a mode of a wearable device based on an input of the user.
Figure 8B:
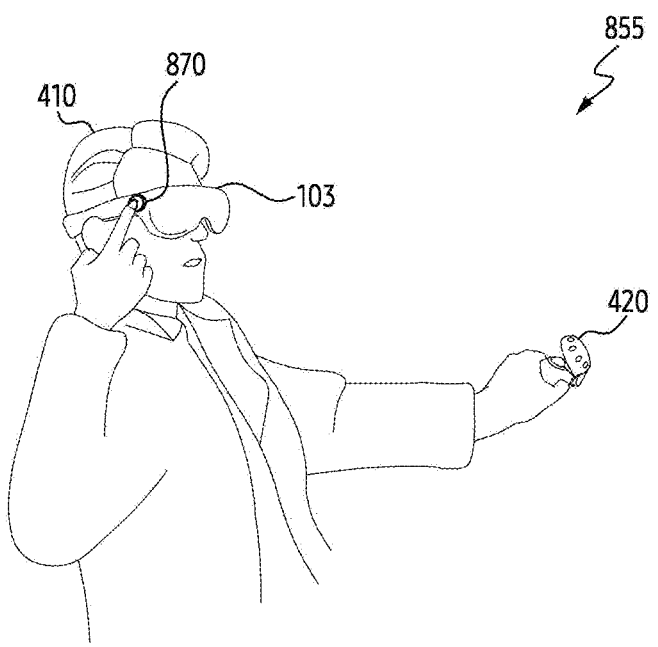

FIG. 8B illustrates an example of a method of changing a mode of a wearable device based on the user's input.

The external electronic device 420 of FIG. 8B may represent the external electronic device 420 of FIG. 4 and the external electronic device 420 of FIG. 5. The wearable device 103 of FIG. 8B may represent the electronic device 101 of FIG. 1, the wearable device 103 of FIGS. 2A, 2B, 3A, and 3B, the wearable device 103 of FIG. 4, and the wearable device 103 of FIG. 5. For example, wearable device 103 may be connected to the external electronic device 420. The external electronic device 420 may be used to provide the input to the wearable device 103. For example, the input may be caused or input by the user 410.

FIG. 8B illustrates examples 850 and 855 of changing the mode based on the input to the wearable device 103. The mode may represent the shooting mode in which the wearable device 103 obtains images for tracking through the camera 520.

Referring to example 850, the wearable device 103 may obtain an input 860 of user 410. For example, the input 860 may include a designated gesture. For example, the designated gesture may be related to a specific mode. In an example 850, the "X" shaped input 860 may be related to the first mode. In the example 850, while the wearable device 103 executes a mode (e.g., a second mode or a third mode) different from the first mode, the mode may be changed to the first mode in response to obtaining the input 860. However, an embodiment of the present disclosure is not limited thereto. Also, in the example 850, the example in which the input 860 is performed through a right hand gripping the external electronic device 420, but an embodiment of the present disclosure is not limited thereto. For example, the wearable device 103 may recognize the input 860 based on a left hand based on tracking (i.e., hand tracking) the left hand and change the mode based on the input 860.

Referring to the example 855, the wearable device 103 may include a physical button 870. The physical button 870 may be used to change the mode of the wearable device 103. The wearable device 103 may change the mode based on the input of the user 410 for the physical button 870. However, an embodiment of the present disclosure is not limited thereto. For example, although not shown, the physical button 870 may be included in the external electronic device 420. The wearable device 103 may recognize the input of the user 410 for the physical button 870 included in the external electronic device 420. For example, the external electronic device 420 may provide (or transmit) information on the input to the wearable device 103 in response to obtaining the input for the physical button 870 of the user 410. The wearable device 103 may change the mode based on the information.

Figure 9:
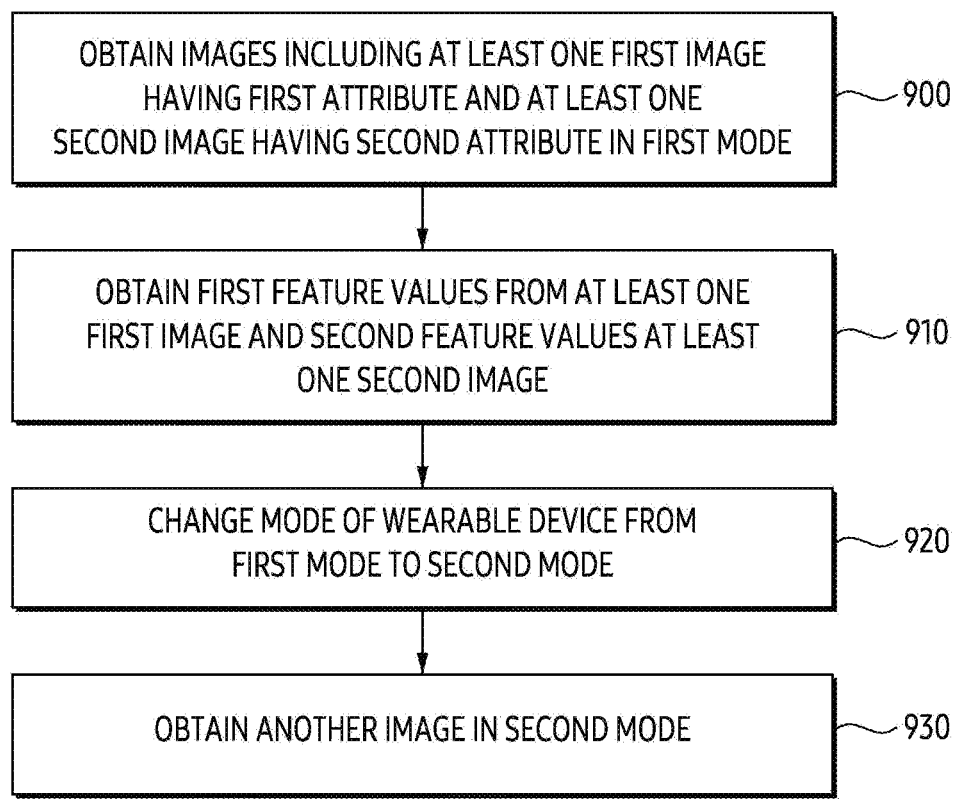
FIG. 9 illustrates an example of an operation flow of a method of obtaining an image for tracking of body portion and images including an image for tracking of an external electronic device according to a mode of the wearable device.

FIG. 9 illustrates an example of an operation flow of a method of obtaining an image for tracking of a body portion and images including an image for tracking of an external electronic device according to a mode of a wearable device.

At least a portion of the method of FIG. 9 may be performed by the wearable device 103 of FIG. 5. For example, at least the portion of the method may be controlled by a processor 510 of the wearable device 103. In the following embodiment, each of operations may be performed sequentially, but is not necessarily performed sequentially. For example, the order of each of operations may be changed, and at least two operations may be performed in parallel.

In operation 900, according to an embodiment, the wearable device 103 may obtain images including at least one first image having a first attribute and at least one second image having a second attribute in a first mode. For example, the wearable device 103 may obtain the at least one first image, and the at least one second image through a camera 520 in the first mode. For example, the first mode may represent a shooting mode in which one image having the first attribute and one image having the second attribute are alternately obtained. The first mode may be referred to as a basic mode of wearable device 103.

For example, the at least one first image having the first attribute may be used to track (e.g., a first tracking) the body portion (e.g., a head or a hand) of a user wearing the wearable device 103. Also, the at least one second image having the second attribute may be used for tracking (e.g., a second tracking) the external electronic device 420 connected to the wearable device 103. For example, the number of the at least one first image(s) in the images obtained in the basic mode may correspond to the number of the at least one second image(s) in the images. In other words, an FPS of the at least one first image(s) may be the same as an FPS of the at least one second image(s).

In an operation 910, according to an embodiment, the wearable device 103 may obtain first feature values from the at least one first image(s) and second feature values from the at least one second image(s). For example, the wearable device 103 may obtain the first feature values or the second feature values using each of the images.

For example, each of the first attribute and the second attribute may include a first brightness and a second brightness. For example, the first brightness is brighter than the second brightness. For example, the at least one first image having the first brightness may be used to obtain the first feature values for the first tracking. For example, the first feature values may include a boundary or a point of an external object for the first tracking. Also, for example, the at least one second image having the second brightness may be used to obtain second feature values for the second tracking. For example, the second feature values may include light sources of the external electronic device 420 for the second tracking.

In an operation 920, according to an embodiment, the wearable device 103 may change the mode of the wearable device 103 from the first mode to the second mode. For example, the wearable device 103 may change the mode from the first mode to the second mode based on the first feature values and the second feature values. For example, the second mode may represent the shooting mode in which the at least one first image(s) for the first tracking and the at least one second image(s) for the second tracking are alternately obtained with different FPS (or the number of images).

According to an embodiment, the wearable device 103 may identify the quality of each of tracking based on feature values. The quality may be referred to as pose quality. For example, the wearable device 103 may identify a first quality of the first tracking based on the first feature values. For example, the wearable device 103 may identify a second quality of the second tracking based on the second feature values.

According to an embodiment, the wearable device 103 may change the mode (or shooting mode) of the wearable device 103 based on a comparison result between the quality of each of tracking and reference value of each of tracking. For example, the wearable device 103 may compare the first quality with a first reference value set for the first tracking. Also, for example, the wearable device 103 may compare the second quality with a second reference value set for the second tracking. The first reference value set may include at least one reference value. The second reference value set may include at least one reference value. For example, it is assumed that the first reference value set includes the first reference value and the second reference value set includes the second reference value. For example, the wearable device 103 may execute the first mode in the case that the first quality is higher than or equal to the first reference value and the second quality is higher than or equal to the second reference value. For example, the wearable device 103 may execute the first mode in the case that the first quality is lower than the first reference value and the second quality is lower than the second reference value. For example, the wearable device 103 may execute the second mode in the case that the first quality is higher than or equal to the first reference value and the second quality is lower than the second reference value, or in case the that the first quality is lower than the first reference value and the second quality is higher than or equal to the second reference value. For example, in the second mode executed in response to the case where the first quality is higher than or equal to the first reference value and the second quality is lower than the second reference value, the number (or FPS) of images for the second tracking may be greater (or higher) than the number (or FPS) of image for the first tracking. Additionally and/or alternatively, for example, in the second mode executed in response to the case where the first quality is lower than the first reference value and the second quality is higher than or equal to the second reference value, the number (or FPS) of images for the first tracking may be greater (or higher) than the number (or FPS) of images for the second tracking. In the above example, a case where each of the first reference value set and the second reference value set includes one reference value is described, but an embodiment of the present disclosure is not limited thereto. For example, each of the first reference value set and the second reference value set may include a plurality of reference values. Based on the plurality of reference values, the number (or FPS) of the images for a specific tracking (e.g., the first tracking and the second tracking) obtained through the camera 520 may be adjusted. For example, it is assumed that the first reference value set includes the plurality of reference values (e.g., a first reference value and a second reference value). In the case that the first quality is lower than the first reference value, the wearable device 103 may obtain the images for the first tracking based on a first FPS. In the case that the first quality is higher than or equal to the first reference value and lower than the second reference value, the wearable device 103 may obtain the images for the first tracking based on a second FPS smaller than the first FPS. At this time, each of the first FPS and the second FPS may be a value (i.e., when the number of the images for the first tracking is greater than the number of the images for the second tracking) higher than the FPS of the image for the second tracking.

Although not illustrated in FIG. 9, according to an embodiment, the wearable device 103 may change the mode based on the input. For example, the wearable device 103 may change the mode based on a gesture set in the wearable device 103. For example, the wearable device 103 may include a first gesture for the first mode, a second gesture for the second mode, and a third gesture for the third mode. Further, for example, the wearable device 103 may change the mode based on the input for the physical button included in the wearable device 103. Specific details related to this may be referred to as an example of FIG. 8B.

Although not illustrated in FIG. 9, according to an embodiment, the wearable device 103 may change the mode based on the executed software application or a setting in the wearable device 103. For example, the wearable device 103 may recognize the mode set in the software application in response to executing the software application. The wearable device 103 may change the mode of the wearable device 103 to the set mode. Additionally and/or alternatively, for example, the wearable device 103 may recognize the set mode according to the setting in the wearable device 103. For example, the setting in the wearable device 103 may be changed based on at least a portion of the user's input. The wearable device 103 may change the mode to the set mode. For example, when the software application (e.g., a game) requiring a relatively large amount of movement (as compared to a predetermined amount of movement) of the external electronic device 420 (or a controller) is executed or the setting in the wearable device 103 is changed, the wearable device 103 may change the mode from the first mode to the second mode. At this time, the second mode may represent the shooting mode in which the number of the images for the first tracking is smaller than the number of the images for the second tracking. This may be to increase the accuracy or response speed of tracking for the movement of the external electronic device 420. Specific details related to this may be referred to as an example of FIG. 8A below.

Although not illustrated in FIG. 9, according to an embodiment, the wearable device 103 may change the mode based on the movement of the external electronic device 420 (or a controller) connected to the wearable device 103. For example, the wearable device 103 may change the mode from the first mode to the second mode based on identifying that the movement is lower than reference frequency. The second mode executed in response to the case where the movement is lower than the reference frequency may represent the shooting mode in which the number of the images for the first tracking is larger than the number of the images for the second tracking. This is because in the case that the movement is lower than the reference frequency, the second tracking of the external electronic device 420 is not required. Specific details related to this may be referred to as an example of FIG. 8A below.

Although not illustrated in FIG. 9, according to an embodiment, the wearable device 103 may recognize the movement of the external electronic device 420 based on a sensor 530. For example, the wearable device 103 may obtain information on the movement of the external electronic device 420 through the sensor 530 (e.g., an IMU sensor). The wearable device 103 may change the mode based on the movement identified based on the information.

Referring to the above, the wearable device 103 may identify whether a designated condition for changing the mode is satisfied. In the case that the designated condition is satisfied, the wearable device 103 may change the mode. In contrast, if the designated condition is not satisfied, the wearable device 103 may obtain images in a current mode (e.g., the first mode) and perform tracking based on the images. The tracking may include the first tracking and the second tracking.

In the operation 930, the wearable device 103 according to an embodiment may obtain another image in the second mode. For example, in the case that the changed mode is the second mode, the another images may include at least one third image for the first tracking and at least one fourth image for the second tracking. For example, the number (or FPS) of the at least one third image(s) may be different from the number (or FPS) of the at least one fourth image(s). However, an embodiment of the present disclosure is not limited thereto. For example, in the case that the changed mode is the third mode, the another images may include one of at least one third image for the first tracking and at least one fourth image for the second tracking. For example, in the case that the first tracking is unnecessary (e.g., in case that the user's head is fixed), the another images may include the at least one fourth image for the second tracking among at least one third image for the first tracking and at least one fourth image for the second tracking. In contrast, in the case that the second tracking is unnecessary (e.g., in that the user does not grip the external electronic device 420), the another images may include the at least one third image for the first tracking among the at least one third image for the first tracking and the at least one fourth image for the second tracking.

As described above, the wearable device 103 may include memory 560 storing instructions and including one or more storage media. The wearable device 103 may include a camera 520. The wearable device 103 may include at least one processor 510 including processing circuitry. The instructions, when executed by the at least one processor 510 individually or collectively, may cause the wearable device 103 to obtain, through the camera 520 in a first mode, images including at least one first image having the first attribute for tracking of a body portion of the user and at least one second image having the second attribute different from the first attribute for tracking of the external electronic device 420. A first number of the at least one first image may correspond to a second number of the at least one second image. The instructions, when executed by the at least one processor 510 individually or collectively, may cause the wearable device 103 to obtain first feature values for tracking of the body portion from the at least one first image and second feature values for tracking of the external electronic device 420 from the at least one second image. The instructions, when executed by the at least one processor 510 individually or collectively, may cause the wearable device 103 to change the mode of the wearable device 103 from the first mode to the second mode based on the first feature values and the second feature values. The instructions, when executed by the at least one processor 510 individually or collectively, may cause the wearable device 103 to obtain, through the camera 520 in the second mode, another images. A third number of at least one third image having the first attribute of the another images may differ from a fourth number of at least one fourth image having the second attribute of the another images.

According to an embodiment, the body portion may include at least one of the user's head or the user's hand.

According to an embodiment, each of the first attribute and the second attribute may include brightness. The brightness may be identified based on at least one of exposure time for obtaining the image through the camera 250, a gain value for obtaining the image, or brightness level of light source of the wearable device 103.

According to an embodiment, in response to the first attribute representing a first brightness and the second attribute representing a second brightness, the first brightness may be brighter than the second brightness.

According to an embodiment, the images may be obtained based on a designated FPS. A first FPS of the at least one first image may correspond to a second FPS of the at least one second image. The at least one first image having the first attribute of the images and the at least one second image having the second attribute may be alternately obtained.

According to an embodiment, the instructions, when executed by the at least one processor 510 individually or collectively, may cause the wearable device 103 to execute the first mode when a designated condition is satisfied. The designated condition may include at least one of the wearable device 103 is booted, the first quality for tracking of the body portion is higher than or equal to the first reference value and the second quality for tracking of the external electronic device 420 is higher than or equal to the second reference value, or the first quality is lower than the first reference value and the second quality is lower than the second reference value.

According to an embodiment, the instructions, when executed by the at least one processor 510 individually or collectively, may cause the wearable device 103 to obtain the first feature values including a boundary or a point of an object in the at least one first image. The instructions, when executed by the at least one processor 510, may cause the wearable device 103 to obtain the second feature values including at least one light source of the external electronic device 420 in the at least one second image.

According to an embodiment, the instructions, when executed by the at least one processor 510 individually or collectively, may cause the wearable device 103 to obtain the first quality for tracking of the body portion based on the first feature values. The instructions, when executed by the at least one processor 510, may cause the wearable device 103 to obtain the second quality for tracking of the external electronic device 420 based on the second feature values. The first quality may be obtained based on a first variation of the first feature values for each of the at least one first image. The second quality may be obtained based on a second variation of the second feature values for each of the at least one second image.

According to an embodiment, the instructions, when executed by the at least one processor 510 individually or collectively, may cause the wearable device 103 to change the mode from the first mode to the second mode in which the third number of the at least one third image having the first attribute of the another images is larger than the fourth number of the at least one fourth image having the second attribute in response to the first quality being lower than the first reference value and the second quality being higher than or equal to the second reference value.

According to an embodiment, the instructions, when executed by the at least one processor 510 individually or collectively, may cause the wearable device 103 to change the mode from the first mode to the second mode in which the third number of the at least one third image having the first attribute of the another images is smaller than the fourth number of the at least one fourth image having the second attribute in response to the first quality being higher than or equal to the first reference value and the second quality being lower than the second reference value.

According to an embodiment, the instructions, when executed by the at least one processor 510 individually or collectively, may cause the wearable device 103 to execute the software application after obtaining the another images. The instructions, when executed by the at least one processor 510 individually or collectively, may cause the wearable device 103 to change the mode from the second mode to the first mode based on the setting of the software application. The setting may include a first FPS for the at least one first image of the first attribute and a second FPS for the at least one second image having the second attribute to be obtained through the camera 250.

According to an embodiment, the instructions, when executed by the at least one processor 510 individually or collectively, may cause the wearable device 103 to change the mode from the first mode to the second mode in which the third number of the at least one third image having the first attribute of the another images is larger than the fourth number of the at least one fourth image having the second attribute based on identifying the movement of the external electronic device 420 lower than a reference frequency.

According to an embodiment, the instructions, when executed by the at least one processor 510 individually or collectively, may cause the wearable device 103 to change the mode from the second mode to the first mode based on identifying that the movement of the external electronic device 420 having been identified by the sensor of the wearable device 103 is higher than or equal to the reference frequency in the second mode. The sensor may include an inertial measurement unit (IMU) sensor.

According to an embodiment, the instructions, when executed by the at least one processor 510 individually or collectively, may cause the wearable device 103 to change the mode from the first mode to the second mode in which the third number of the at least one third image having the first attribute of the another images is lower than the fourth number of the at least one fourth image having the second attribute based on executing of the software application providing a virtual environment using the external electronic device 420. The first quality based on the at least one third image having the first attribute of the another images may be higher than or equal to a first reference value, while the second mode is executed.

According to an embodiment, the instructions, when executed by the at least one processor 510 individually or collectively, may cause the wearable device 103 to change the mode from the second mode to a third mode when a designated condition is satisfied. The designated condition may include the setting of the tracking of the external electronic device 420 among the tracking of the body portion and the tracking of the external electronic device 420. Images having the second attribute among the first attribute and the second attribute may be obtained through the camera 520 in the third mode.

According to an embodiment, the instructions, when executed by the at least one processor 510 individually or collectively, may cause the wearable device 103 to change the mode from the second mode to a third mode when the designated condition is satisfied. The designated condition may include the setting of the tracking of the body portion among the tracking of the body portion and the tracking of the external electronic device 420. Images having the first attribute among the first attribute and the second attribute may be obtained through the camera 520 in the third mode.

According to an embodiment, the instructions, when executed by the at least one processor 510 individually or collectively, may cause the wearable device 103 to change the mode from the third mode to the first mode based on the input of the user. The input of the user may include at least one of the input for the physical button of the wearable device 103 or the designated gesture of the user.

As described above, the method performed by the wearable device 103 may include obtaining, in the first mode, the images including at least one first image having the first attribute for tracking of a body portion of the user and at least one second image having the second attribute different from the first attribute for tracking of the external electronic device 420. A first number of the at least one first image may correspond to a second number of the at least one second image. The method may include obtaining the first feature values for tracking of the body portion from the at least one first image and the second feature values for tracking of the external electronic device 420 from the at least one second image. The method may include changing the mode of the wearable device 103 from the first mode to the second mode based on the first feature values and the second feature values. The method may include obtaining, in the second mode, another images through the camera 520. A third number of at least one third image having the first attribute of the another images may differ from a fourth number of at least one fourth image having the second attribute of the another images.

According to an embodiment, each of the first attribute and the second attribute may include brightness. The brightness may include at least one of exposure time for obtaining the image through the camera 250, a gain value for obtaining the image, or brightness level of a light source of the wearable device 103.

As described above, a non-transitory computer-readable storage medium, when executed by at least one processor 510 of the wearable device 103 comprising the camera 520 individually or collectively, may store one or more program including instructions that causes the wearable device 103 to obtain, through the camera 520 in the first mode, the images including at least one first image having the first attribute for tracking of a body portion of the user and at least one second image having the second attribute different from the first attribute for tracking of an external electronic device 420. A first number of the at least one first image may correspond to a second number of the at least one second image. The non-transitory computer-readable storage medium may store one or more programs including instructions, when executed by the at least one processor 510, that cause the wearable device 103 to obtain the first feature values for tracking of the body portion from the at least one first image and the second feature values for tracking of the external electronic device 420 from the at least one second image. The non-transitory computer-readable storage medium may store one or more programs including instructions, when executed by the at least one processor 510, that cause the wearable device 103 to change the mode of the wearable device 103 from the first mode to the second mode based on the first feature values and the second feature values. The non-transitory computer-readable storage medium may store one or more programs including instructions, when executed by the at least one processor 510, that cause the wearable device 103 to obtain through the camera 520 in the second mode, another images. A third number of at least one third image having the first attribute of the another images may differ from a fourth number of at least one fourth image having the second attribute of the another images.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. A wearable device comprising:
   memory, comprising one or more storage media, storing instructions;
   a camera; and
   at least one processor comprising processing circuitry,
   wherein the instructions, when executed by the at least one processor individually or collectively, cause the wearable device to:
   obtain, through the camera in a first mode, images including at least one first image having a first attribute for tracking of a body portion of a user and at least one second image having a second attribute different from the first attribute for tracking of an external electronic device, wherein a first number of the at least one first image corresponds to a second number of the at least one second image;

obtain first feature values for tracking of the body portion from the at least one first image and second feature values for tracking the external electronic device from the at least one second image;

change a mode of the wearable device from the first mode to a second mode based on the first feature values and the second feature values; and obtain, through the camera in the second mode, another images, wherein a third number of at least one third image having the first attribute of the another images differs from a fourth number of at least one fourth image having the second attribute of the another images.

2. The wearable device of claim 1, wherein the instructions, when executed by the at least one processor individually or collectively, cause the wearable device to:

obtain the first feature values including a boundary or a point of an object in the at least one first image; and obtain the second feature values including at least one light source of the external electronic device in the at least one second image.

3. The wearable device of claim 2, wherein the instructions, when executed by the at least one processor individually or collectively, cause the wearable device to:

obtain a first quality for tracking of the body portion based on the first feature values; and obtain a second quality for tracking of the external electronic device based on the second feature values, wherein the first quality is obtained based on a first variation of the first feature values for each of the at least one first image, wherein the second quality is obtained based on a second variation of the second feature values for each of the at least one second image.

4. The wearable device of claim 3, wherein the instructions, when executed by the at least one processor individually or collectively, cause the wearable device to:

change the mode from the first mode to the second mode in which the third number of the at least one third image having the first attribute of the another images is larger than the fourth number of the at least one fourth image having the second attribute, in response to the first quality being lower than a first reference value and the second quality being higher than or equal to a second reference value.

5. The wearable device of claim 3, wherein the instructions, when executed by the at least one processor individually or collectively, cause the wearable device to:

change the mode from the first mode to the second mode in which the third number of the at least one third image having the first attribute of the another images is smaller than the fourth number of the at least one fourth image having the second attribute, in response to the first quality being higher than or equal to a first reference value and the second quality being lower than a second reference value.

6. The wearable device of claim 1, wherein the body portion includes at least one of a head of the user or a hand of the user.

7. The wearable device of claim 1, wherein each of the first attribute and the second attribute has brightness, wherein the brightness is identified based on at least one of exposure time for obtaining an image through the camera, a gain value for obtaining the image, or brightness level of a light source of the wearable device.

8. The wearable device of claim 7, wherein in response to the first attribute representing a first brightness and the second attribute representing a second brightness, the first brightness is brighter than the second brightness.

9. The wearable device of claim 1, wherein the images are obtained based on a designated frame per second (FPS), wherein a first FPS of the at least one first image corresponds to a second FPS of the at least one second image, and wherein the at least one first image having the first attribute of the images and the at least one second image having the second attribute are alternately obtained.

10. The wearable device of claim 1, wherein the instructions, when executed by the at least one processor individually or collectively, cause the wearable device to:

execute the first mode when a designated condition is satisfied, wherein the designated condition includes at least one of the wearable device is booted, a first quality for tracking of the body portion is higher than or equal to a first reference value and a second quality for tracking of the external electronic device is higher than or equal to a second reference value, or the first quality is lower than the first reference value and the second quality is lower than the second reference value.

11. The wearable device of claim 1, wherein the instructions, when executed by the at least one processor individually or collectively, cause the wearable device to:

execute a software application after obtaining the another images; and change the mode from the second mode to the first mode based on a setting of the software application, wherein the setting includes a first FPS for the at least one first image of the first attribute and a second FPS for the at least one second image having the second attribute to be obtained through the camera.

12. The wearable device of claim 1, wherein the instructions, when executed by the at least one processor individually or collectively, cause the wearable device to:

change the mode from the first mode to the second mode in which the third number of the at least one third image having the first attribute of the another images is larger than the fourth number of the at least one fourth image having the second attribute based on identifying movement of the external electronic device lower than a reference frequency.

13. The wearable device of claim 12, wherein the instructions, when executed by the at least one processor individually or collectively, cause the wearable device to:

change the mode from the second mode to the first mode based on identifying that the movement of the external electronic device having been identified by a sensor of the wearable device is higher than or equal to the reference frequency in the second mode, wherein the sensor includes an inertial measurement unit (IMU) sensor.

14. The wearable device of claim 1,
wherein the instructions, when executed by the at least one processor individually or collectively, cause the wearable device to:
change the mode from the first mode to the second mode in which the third number of the at least one third image having the first attribute of the another images is lower than the fourth number of the at least one fourth image having the second attribute based on executing of a software application providing a virtual environment using the external electronic device,
wherein a first quality based on the at least one third image having the first attribute of the another images is higher than or equal to a first reference value while the second mode is executed.

15. The wearable device of claim 1,
wherein the instructions, when executed by the at least one processor individually or collectively, cause the wearable device to:
change the mode from the second mode to a third mode when a designated condition is satisfied,
wherein the designated condition includes a setting of the tracking of the external electronic device among the tracking of the body portion and the tracking of the external electronic device, and
wherein images having the second attribute among the first attribute and the second attribute are obtained through the camera in the third mode.

16. The wearable device of claim 1,
wherein the instructions, when executed by the at least one processor individually or collectively, cause the wearable device to:
change the mode from the second mode to a third mode when a designated condition is satisfied,
wherein the designated condition includes a setting of the tracking of the body portion among the tracking of the body portion and the tracking of the external electronic device, and
wherein images having the first attribute among the first attribute and the second attribute are obtained through the camera in the third mode.

17. The wearable device of claim 15,
wherein the instructions, when executed by the at least one processor individually or collectively, cause the wearable device to:
change the mode from the third mode to the first mode based on an input of the user,
wherein the input of the user includes at least one of an input for a physical button of the wearable device or a designated gesture of the user.

18. A method performed by a wearable device, the method comprising:
obtaining, in a first mode, images including at least one first image having a first attribute for tracking of a body portion of a user and at least one second image having a second attribute different from the first attribute for tracking of an external electronic device, wherein a first number of the at least one first image corresponds to a second number of the at least one second image;
obtaining first feature values for tracking of the body portion from the at least one first image and second feature values for tracking the external electronic device from the at least one second image;
changing a mode of the wearable device from the first mode to a second mode based on the first feature values and the second feature values; and
obtaining, in the second mode, another images,
wherein a third number of at least one third image having the first attribute of the another images differs from a fourth number of at least one fourth image having the second attribute of the another images.

19. The method of claim 18,
wherein each of the first attribute and the second attribute includes brightness,
wherein the brightness includes at least one of exposure time for obtaining an image through the camera, a gain value for obtaining the image, or brightness level of a light source of the wearable device.

20. A non-transitory computer-readable storage medium comprising instructions that, when individually or collectively executed by at least one processor of a wearable device comprising a camera, cause the wearable device to:
obtain, through the camera in a first mode, images including at least one first image having a first attribute for tracking of a body portion of a user and at least one second image having a second attribute different from the first attribute for tracking of an external electronic device, wherein a first number of the at least one first image corresponds to a second number of the at least one second image;
obtain first feature values for tracking of the body portion from the at least one first image and second feature values for tracking the external electronic device from the at least one second image;
change a mode of the wearable device from the first mode to a second mode based on the first feature values and the second feature values; and
obtain, through the camera in the second mode, another images,
wherein a third number of at least one third image having the first attribute of the another images differs from a fourth number of at least one fourth image having the second attribute of the another images.

* * * * *